United States Patent
Fenney et al.

(10) Patent No.: US 11,715,256 B2
(45) Date of Patent: *Aug. 1, 2023

(54) INTERSECTION TESTING IN A RAY TRACING SYSTEM USING RAY COORDINATE SYSTEM BASIS VECTORS

(71) Applicant: Imagination Technologies Limited, Kings Langley (GB)

(72) Inventors: Simon Fenney, Hertfordshire (GB); Rostam King, Hertfordshire (GB); Peter Smith-Lacey, Hertfordshire (GB); Gregory Clark, Hertfordshire (GB)

(73) Assignee: Imagination Technologies Limited, Kings Langley (GB)

( * ) Notice: Subject to any disclaimer, the term of this patent is extended or adjusted under 35 U.S.C. 154(b) by 0 days.

This patent is subject to a terminal disclaimer.

(21) Appl. No.: 17/702,110

(22) Filed: Mar. 23, 2022

(65) Prior Publication Data
US 2022/0351460 A1 Nov. 3, 2022

(30) Foreign Application Priority Data
Mar. 23, 2021 (GB) .................................... 2104061

(51) Int. Cl.
*G06T 15/06* (2011.01)
*G06T 15/00* (2011.01)
(52) U.S. Cl.
CPC ............ *G06T 15/06* (2013.01); *G06T 15/005* (2013.01); *G06T 2210/21* (2013.01)
(58) Field of Classification Search
None
See application file for complete search history.

(56) References Cited

U.S. PATENT DOCUMENTS 6,621,925 B1* 9/2003 Ohmori ................. G06T 15/005
358/518
2002/0033835 A1 3/2002 Sowizral et al.
(Continued)

FOREIGN PATENT DOCUMENTS

EP 2335224 A1 6/2011
EP 2592600 A2 5/2013

OTHER PUBLICATIONS

Wald; "Realtime Ray Tracing and Interactive Global Illumination"; URL: https://www.sci.utah.edu/~wald/PhD/wald_phd.pdf; 2004; 308 pages.
(Continued)

*Primary Examiner* — Andrew G Yang
(74) *Attorney, Agent, or Firm* — Potomac Law Group, PLLC; Vincent M DeLuca

(57) ABSTRACT

A method and an intersection testing module for performing intersection testing of a ray with a box in a ray tracing system. The ray and the box are defined in a 3D space using a space-coordinate system, and the ray is defined with a ray origin and a ray direction. A ray-coordinate system is used to perform intersection testing, wherein the ray-coordinate system has an origin at the ray origin, and the ray-coordinate system has three basis vectors. A first of the basis vectors is aligned with the ray direction. A second and a third of the basis vectors: (i) are both orthogonal to the first basis vector, (ii) are not parallel with each other, and (iii) have a zero as one component when expressed in the space-coordinate system. A result of performing the intersection testing is outputted for use by the ray tracing system.

20 Claims, 5 Drawing Sheets

(56) References Cited

U.S. PATENT DOCUMENTS

| | | | | |
|---|---|---|---|---|
| 2007/0165035 | A1* | 7/2007 | Duluk, Jr. | G06T 15/20 345/506 |
| 2013/0016109 | A1* | 1/2013 | Garanzha | G06T 15/06 345/543 |
| 2015/0363970 | A1* | 12/2015 | Spinella-Mamo | G06T 7/596 345/420 |
| 2018/0182158 | A1 | 6/2018 | Karras et al. | |
| 2020/0193685 | A1* | 6/2020 | Saleh | G06T 15/80 |
| 2021/0390759 | A1* | 12/2021 | Muthler | G06T 17/205 |
| 2022/0180086 | A1* | 6/2022 | Mitani | G06F 18/00 |
| 2022/0270762 | A1* | 8/2022 | Crawford | G06V 20/70 |

OTHER PUBLICATIONS

"Ray tracing primitives"; https://www.cl.cam.ac.Uk/teaching/1999/AGraphHCI/SMAG/node2.html#SECTION000231000000000000000.

Eisemann et al; "Fast Ray/Axis-Aligned Bounding Box Overlap Tests using Ray Slopes"; URL: https://graphics.tu-bs.de/upload/publications/fast-rayaxis-aligned-bounding-box-overlap-tests-using-ray-slopes.pdf; pp. 1-21.

Havel et al; "Yet Faster Ray-Triangle Intersection (Using SSE4)"; IEEE Transactions on Visualization and Computer Graphics; vol. 16; No. 3; May/Jun. 2010; pp. 434-438.

Kay et al; "Ray Tracing Complex Scenes"; Computer Graphics; vol. 20; No. 4; 1986; p. 269-278.

Kensler et al; "Optimizing Ray-Triangle Intersection via Automated Search"; School of Computing; University of Utah; pp. 1-6.

Mahovsky et al; "Fast Ray-Axis Aligned Bounding Box Overlap Tests with Plücker Coordinates"; vol. 9; No. 1 pp. 35-46.

Majercik et al; "A Ray-Box Intersection Algorithm and Efficient Dynamic Voxel Rendering"; URL: https://jcgt.org/published/0007/03/04/paper-lowres.pdf sections 2-5.

Möller et al; "Fast, Minimum Storage Ray/Triangle Intersection"; pp. 1-7.

Shevtsov et al; "Ray-Triangle Intersection Algorithm for Modern CPU Architectures"; Russia, Moscow, Jun. 23-27, 2007; pp. 1-7.

Smits; "Efficiency Issues for Ray Tracing"; University of Utah; Feb. 19, 1999; pp. 1-12.

Toth; "On Ray Tracing Parametric Surfaces"; Computer Graphics Development; Ford Motor Company; vol. 19; No. 3; 1985; San Francisco Jul. 22-26; pp. 171-179.

Woop et al.; "Watertight Ray/Triangle Intersection"; Journal of Computer Graphics Techniques; vol. 2; No. 1; 2013 pp. 65-82.

* cited by examiner

INTERSECTION TESTING IN A RAY TRACING SYSTEM USING RAY COORDINATE SYSTEM BASIS VECTORS

FIELD

The present disclosure is directed to techniques of performing intersection testing in a ray tracing system.

BACKGROUND

Ray tracing is a computational rendering technique for generating an image of a scene (e.g. a 3D scene) by tracing paths of light ('rays') usually from the viewpoint of a camera through the scene. Each ray is modelled as originating from the camera and passing through a pixel into the scene. As a ray traverses the scene it may intersect objects within the scene. The interaction between a ray and an object it intersects can be modelled to create realistic visual effects. For example, in response to determining an intersection of a ray with an object, a shader program (i.e. a portion of computer code) may be executed in respect of the intersection. A programmer can write the shader program to define how the system reacts to the intersection which may, for example cause one or more secondary rays to be emitted into the scene, e.g. to represent a reflection of the ray off the intersected object or a refraction of the ray through the object (e.g. if the object is transparent or translucent). As another example, the shader program could cause one or more rays to be emitted into the scene for the purposes of determining whether the object is in shadow at the intersection point. The result of executing the shader program (and processing the relevant secondary rays) can be the calculation of a colour value for the pixel the ray passed through.

Rendering an image of a scene using ray tracing may involve performing many intersection tests, e.g. billions of intersection tests for rendering an image of a scene. In order to reduce the number of intersection tests that need to be performed, ray tracing systems can generate acceleration structures, wherein each node of an acceleration structure represents a region within the scene. Acceleration structures are often hierarchical (e.g. having a tree structure) such that they include multiple levels of nodes, wherein nodes near the top of the acceleration structure represent relatively large regions in the scene (e.g. the root node may represent the whole scene), and nodes near the bottom of the acceleration structure represent relatively small regions in the scene. A "tree node" refers to a node which has pointers to other nodes in the hierarchical acceleration structure, i.e. a tree node has child nodes in the hierarchical acceleration structure. A "leaf node" refers to a node which has one or more pointers to one or more primitives, i.e. a leaf node does not have child nodes in the hierarchical acceleration structure. In other words, leaf nodes of the acceleration structure represent regions bounding one or more primitives in the scene. The acceleration structure can have different structures in different examples, e.g. a grid structure, an octree structure, a space partitioning structure (e.g. a k-d tree) or a bounding volume hierarchy. The nodes can represent suitable shapes or regions in the scene (which may be referred to herein as "boxes"). In some examples the nodes represent axis-aligned bounding boxes (AABBs) in the scene.

Intersection testing can be performed for a ray (e.g. in a recursive manner) using the acceleration structure by first testing the ray for intersection with the root node of the acceleration structure. If the ray is found to intersect a parent node (e.g. the root node), testing can then proceed to the child nodes of that parent. In contrast, if the ray is found not to intersect a parent node, intersection testing of the child nodes of that parent node can be avoided, saving computational effort. If a ray is found to intersect a leaf node then it can be tested against the objects within the region represented by the leaf node to thereby determine which object(s) the ray intersects with. If more than one intersection is found for a ray then the closest of the intersection points to the ray's origin (i.e. the first intersection that the ray encounters in the scene) may be identified and the ray may be determined to intersect at this identified closest intersection. It is possible that there may be multiple closest hits for a ray, and in this case some tie-break logic may be used to select one of the multiple closest hits to use as the identified closest intersection. For some types of rays, the closest intersection might not need to be identified. For example, when processing shadow rays, an indication that there is at least one intersection is sufficient, without determining which of the intersections is the closest, and some APIs may allow the traversal of an acceleration structure for shadow rays to be terminated in response to finding any intersection, to thereby reduce the number of intersection tests that need to be performed. The use of an acceleration structure (rather than testing rays directly with objects in the scene) reduces the number of intersection tests that need to be performed, and simplifies the intersection tests. The intersection tests are simpler because the nodes of the acceleration structure represent basic shapes (e.g. axis-aligned bounding boxes or spheres) for which intersection tests are simpler than for more complex object shapes, e.g. defined in terms of triangular primitives for which the alignment relative to the axes of the coordinate system is not predetermined.

A ray (r) can be defined as r=O+Dt where O is a vector which represents the ray origin, D is a vector which represents the ray direction and t represents a distance along the ray from the origin. According to one approach a ray can be tested against an axis-aligned box by finding, for each of the x, y and z dimensions, an interval of for which the ray is between the two planes representing the sides of the box which are perpendicular to that dimension. This gives three intervals for values of t (one for the x dimension, one for the y dimension and one for the z dimension). If the intersection of these three intervals (itself an interval) is empty then the ray does not intersect the axis-aligned box; whereas if the intersection of these three intervals is not empty then the ray may intersect the axis-aligned box. This intersection testing method involves performing six tests to find the three intervals of t, and then a comparison to determine whether the intersection of those intervals is empty.

According to another approach, a ray can be tested against the edges of a box that form a 2D silhouette of the box from the viewpoint of the ray. If the ray passes on the inside of each of the silhouette edges, then it is determined that the ray intersects the box, whereas if the ray passes on the outside of one or more of the silhouette edges of the box then it is determined that the ray does not intersect the box. An AABB normally has 6 silhouette edges (depending upon the orientation of the AABB from the viewpoint of the ray), so this approach normally requires six tests to be performed.

The tests described above would determine whether an infinitely long line aligned with the ray would intersect the box. However, a ray is not typically infinite in length, and may have one or more valid intervals. For example, a ray may have some minimum distance and some maximum distance from the ray origin, which may be defined in terms of a minimum value of t (referred to as a minimum culling distance, $t_{min}$), and a maximum value of t (referred to as a maximum culling distance, $t_{max}$). Therefore, a minimum distance test may be performed to check that the minimum culling distance is not greater than a largest intersection distance to an intersection point of the ray with a box; and a maximum distance test may be performed to check that the maximum culling distance is not less than a smallest intersection distance to an intersection point of the ray with the box. In the first example described above, in which intersecting intervals are used to determine whether a ray intersects a box, rather than performing separate minimum distance and maximum distance tests, a starting interval may be initialised to represent a range of t values between $t_{min}$ and $t_{max}$, such that the result of determining whether there is any intersection between the intervals will only determine that there is an intersection if an intersection occurs for a value of t between $t_{min}$ and $t_{max}$. Each of the endpoints of the range $t_{min}$ and $t_{max}$ can either be included or excluded from the interval.

Since intersection tests of rays against shapes corresponding to the nodes of an acceleration structure, e.g. axis-aligned boxes, are performed many times, it can be beneficial to implement the functionality for performing these intersection tests in dedicated hardware modules, e.g. using fixed function circuitry, rather than implementing these intersection tests using software modules executed on general purpose processing units. Software implementations generally provide more flexibility because software is more easily altered after it is designed and/or created than hardware implementations are. However, hardware implementations generally provide more efficient implementations in terms of latency and power consumption, so if the desired functionality is known in advance, hardware implementations may be preferred over software implementations. When designing a hardware implementation of an intersection testing module which is configured for performing intersection testing there are generally competing aims of having: (i) a smaller size (i.e. smaller silicon area), (ii) a lower latency, and (iii) lower power consumption.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

There is provided a method of performing intersection testing of a ray with a box in a ray tracing system, wherein the ray and the box are defined in a 3D space using a space-coordinate system, and wherein the ray is defined with a ray origin and a ray direction, the method comprising:

using a ray-coordinate system to perform intersection testing, wherein the ray-coordinate system has an origin at the ray origin, and wherein the ray-coordinate system has three basis vectors, wherein a first of the basis vectors is aligned with the ray direction; and wherein a second and a third of the basis vectors: (i) are both orthogonal to the first basis vector, (ii) are not parallel with each other, and (iii) have a zero as one component when expressed in the space-coordinate system; and outputting a result of performing the intersection testing for use by the ray tracing system.

The method may further comprise translating one or more position vectors defining the position of the box for use in performing the intersection testing by subtracting the ray origin from the one or more position vectors defining the position of the box.

The second and the third of the basis vectors of the ray-coordinate system may have a value of $\pm 1$ as one component when expressed in the space-coordinate system.

The first basis vector, S, when expressed with components of the space-coordinate system may be $S=A(D_x, D_y, D_z)$, wherein the second basis vector, P, when expressed with components of the space-coordinate system may be $P=B(D_z, 0, -D_x)$; and wherein the third basis vector, Q, when expressed with components of the space-coordinate system may be $Q=C(0, D_z, -D_y)$; wherein $D_x$, $D_y$ and $D_z$ are components of the ray direction in the space-coordinate system and A, B and C are scalar values.

B may be a simplified fraction with $D_x$ in its denominator, and C may be a simplified fraction with $D_y$ in its denominator.

The first basis vector, S, when expressed with components of the space-coordinate system may be $S=A(D_x, D_y, D_z)$, wherein the second basis vector, P, when expressed with components of the space-coordinate system may be $$P = \left(\pm 1, 0, \mp \frac{D_x}{D_z}\right);$$

and wherein the third basis vector, Q, when expressed with components of the space-coordinate system may be $$Q = \left(0, \pm 1, \mp \frac{D_y}{D_z}\right);$$

wherein $D_x$, $D_y$ and $D_z$ are components of the ray direction in the space-coordinate system and A is a scalar value.

The first basis vector, S, when expressed with components of the space-coordinate system may be $S=A(D_x, D_y, D_z)$, wherein the second basis vector, P, when expressed with components of the space-coordinate system may be $$P = \left(\pm \frac{D_z}{D_x}, 0, \mp 1\right);$$

and wherein the third basis vector, Q, when expressed with components of the space-coordinate system may be $$Q = \left(0, \pm \frac{D_z}{D_y}, \mp 1\right);$$

wherein $D_x$, $D_y$ and $D_z$ are components of the ray direction in the space-coordinate system and A is a scalar value.

The first basis vector, S, when expressed with components of the space-coordinate system may be $S=A(D_x, D_y, D_z)$, wherein the second basis vector, P, when expressed with components of the space-coordinate system may be $$P = \left(\pm \frac{1}{D_x}, 0, \mp \frac{1}{D_z}\right);$$

and wherein the third basis vector, Q, when expressed with components of the space-coordinate system may be $$Q = \left(0, \pm \frac{1}{D_y}, \mp \frac{1}{D_z}\right);$$

wherein $D_x$, $D_y$ and $D_z$ are components of the ray direction in the space-coordinate system and A is a scalar value.

The first basis vector, S, when expressed with components of the space-coordinate system may be $S=A(D_x, D_y, D_z)$, wherein the second basis vector, P, when expressed with components of the space-coordinate system may be $P=(\pm D_z, 0, \mp D_x)$; and wherein the third basis vector, Q, when expressed with components of the space-coordinate system may be $Q=(0, \pm D_z, \mp D_y)$; wherein $D_x$, $D_y$ and $D_z$ are components of the ray direction in the space-coordinate system and A is a scalar value.

In some examples, $$A = \frac{1}{|D_z|}.$$

The method may further comprise transforming the ray and the box from the space-coordinate system into the ray-coordinate system, wherein the intersection testing may be performed in the ray-coordinate system.

The intersection testing may be performed using fixed function circuitry. The fixed function circuitry may comprise one or more multiply-and-add components for performing multiplications and additions using the second and third basis vectors of the ray-coordinate system.

The method may further comprise selectively permuting the components of the ray and the axis-aligned box, such that $|D_z| \geq |D_x|$ and $|D_z| \geq |D_y|$, before performing intersection testing of the ray with the axis-aligned box.

The method may further comprise selectively reversing the components of the ray and the axis-aligned box, such that $D_x \geq 0$, $D_y \geq 0$ and $D_z \geq 0$, before performing intersection testing of the ray with the axis-aligned box.

Values of at least one of:

(i) $\frac{D_x}{D_y}$ and $\frac{D_y}{D_z}$, (ii) $\frac{D_z}{D_x}$ and $\frac{D_z}{D_y}$, (iii) $\frac{1}{D_x}$ and $\frac{1}{D_y}$, and (iv) $\frac{1}{D_y}$ or $D_z$, may be pre-computed for the ray and stored in a store, wherein the method may comprise reading the stored values from the store for use in performing intersection testing.

The outputted result may be used in the ray tracing system for rendering an image of a 3D scene.

The box may be an axis-aligned bounding box which bounds geometry to be rendered.

The box may correspond to a node of a hierarchical acceleration structure to be used for performing intersection testing in the ray tracing system. The node may be part of a bottom-level acceleration structure (BLAS) for representing geometry in an instance space, and the method may comprise transforming the ray into the instance space.

There is provided a method of performing intersection testing of a ray with a box in a ray tracing system, wherein the ray and the box are defined in an n-dimensional space using a space-coordinate system, wherein $n \geq 3$, and wherein the ray is defined with a ray origin and a ray direction, the method comprising:

using a ray-coordinate system to perform intersection testing, wherein the ray-coordinate system has an origin at the ray origin, and wherein the ray-coordinate system has n basis vectors,
  wherein a first of the basis vectors is aligned with the ray direction,
  wherein (n−1) of the basis vectors are orthogonal to the first basis vector,
  wherein no pairing of the (n−1) basis vectors are parallel with each other, and
  wherein the (n−1) basis vectors have zeros for (n−2) components when expressed in the space-coordinate system; and
outputting a result of performing the intersection testing for use by the ray tracing system.

There is provided an intersection testing module, for use in a ray tracing system, configured to perform intersection testing of a ray with a box, wherein the ray and the box are defined in a 3D space using a space-coordinate system, and wherein the ray is defined with a ray origin and a ray direction, the intersection testing module being configured to:

use a ray-coordinate system to perform intersection testing, wherein the ray-coordinate system has an origin at the ray origin, and wherein the ray-coordinate system has three basis vectors,
  wherein a first of the basis vectors is aligned with the ray direction; and
  wherein a second and a third of the basis vectors: (i) are both orthogonal to the first basis vector, (ii) are not parallel with each other, and (iii) have a zero as one component when expressed in the space-coordinate system; and
output a result of performing the intersection testing for use by the ray tracing system.

The first basis vector, S, when expressed with components of the space-coordinate system may be $S=A(D_x, D_y, D_z)$, wherein the second basis vector, P, when expressed with components of the space-coordinate system may be $P=B(D_z, 0, -D_x)$; and wherein the third basis vector, Q, when expressed with components of the space-coordinate system may be $Q=C(0, D_z, -D_y)$; wherein $D_x$, $D_y$ and $D_z$ are components of the ray direction in the space-coordinate system, A is a scalar value, and either:

(i) $B = \pm \frac{1}{D_x}$ and $C = \pm \frac{1}{D_y}$, or (ii) $B = \pm \frac{1}{D_z D_x}$ and $C = \pm \frac{1}{D_z D_y}$.

The intersection testing module may comprise fixed function circuitry configured to perform intersection testing using the ray-coordinate system. The fixed function circuitry may comprise one or more multiply-and-add components for performing multiplications and additions using the second and third basis vectors of the ray-coordinate system.

The intersection testing module may further comprise a store configured to store values of at least one of:

$$\frac{D_x}{D_z} \text{ and } \frac{D_y}{D_z}, \quad \text{(i)}$$

$$\frac{D_z}{D_x} \text{ and } \frac{D_z}{D_y}, \quad \text{(ii)}$$

$$\frac{1}{D_x} \text{ and } \frac{1}{D_y}, \text{ and} \quad \text{(iii)}$$

$$\frac{1}{D_z} \text{ or } D_z, \quad \text{(iv)}$$

for the ray, wherein the intersection testing module may be configured to read the stored values from the store for use in performing intersection testing.

There is provided an intersection testing module, for use in a ray tracing system, configured to perform intersection testing of a ray with a box, wherein the ray and the box are defined in an n-dimensional space using a space-coordinate system, wherein n≥3, and wherein the ray is defined with a ray origin and a ray direction, the intersection testing module being configured to:

use a ray-coordinate system to perform intersection testing, wherein the ray-coordinate system has an origin at the ray origin, and wherein the ray-coordinate system has n basis vectors,
  wherein a first of the basis vectors is aligned with the ray direction,
  wherein (n−1) of the basis vectors are orthogonal to the first basis vector,
  wherein no pairing of the (n−1) basis vectors are parallel with each other, and
  wherein the (n−1) basis vectors have zeros for (n−2) components when expressed in the space-coordinate system; and
output a result of performing the intersection testing for use by the ray tracing system.

There may be provided an intersection testing module configured to perform any of the methods described herein.

There may be provided computer readable code configured to cause any of the methods described herein to be performed when the code is run.

There may be provided a method of determining, in a ray tracing system, whether a ray intersects a three-dimensional axis-aligned box, the method comprising:
determining whether a first condition is satisfied, wherein the first condition is, or is equivalent to, $$\left| C_x - C_z \frac{D_x}{D_z} \right| \le H_z \frac{D_x}{D_z} + H_x;$$

determining whether a second condition is satisfied, wherein the second condition is, or is equivalent to, $$\left| C_y - C_z \frac{D_y}{D_z} \right| \le H_z \frac{D_y}{D_z} + H_y;$$

determining whether a third condition is satisfied, wherein the third condition is, or is equivalent to, $$\left| C_x \frac{D_y}{D_z} - C_y \frac{D_x}{D_z} \right| \le H_y \frac{D_x}{D_z} + H_x \frac{D_y}{D_z};$$

and
using the determinations of whether the first, second and third conditions are satisfied to determine whether the ray intersects the axis-aligned box;
wherein $C_x$, $C_y$ and $C_z$ are x, y and z components of a position of the centre of the axis-aligned box relative to an origin of the ray, wherein $H_x$, $H_y$ and $H_z$ are half widths of the axis-aligned box in the x, y and z dimensions, and wherein $D_x$, $D_y$ and $D_z$ are x, y and z components of a direction vector of the ray.

There may be provided an intersection testing module, for use in a ray tracing system, configured to determine whether a ray intersects a three-dimensional axis-aligned box, the intersection testing module being configured to:
determine whether a first condition is satisfied, wherein the first condition is, or is equivalent to, $$\left| C_x - C_z \frac{D_x}{D_z} \right| \le H_z \frac{D_x}{D_z} + H_x;$$

determine whether a second condition is satisfied, wherein the second condition is, or is equivalent to, $$\left| C_y - C_z \frac{D_y}{D_z} \right| \le H_z \frac{D_y}{D_z} + H_y;$$

determine whether a third condition is satisfied, wherein the third condition is, or is equivalent to, $$\left| C_x \frac{D_y}{D_z} - C_y \frac{D_x}{D_z} \right| \le H_y \frac{D_x}{D_z} + H_x \frac{D_y}{D_z};$$

and
use the determinations of whether the first, second and third conditions are satisfied to determine whether the ray intersects the axis-aligned box;
wherein $C_x$, $C_y$ and $C_z$ are x, y and z components of a position of the centre of the axis-aligned box relative to an origin of the ray, wherein $H_x$, $H_y$ and $H_z$ are half widths of the axis-aligned box in the x, y and z dimensions, and wherein $D_x$, $D_y$ and $D_z$ are x, y and z components of a direction vector of the ray.

The intersection testing module may be embodied in hardware on an integrated circuit. There may be provided a method of manufacturing, at an integrated circuit manufacturing system, an intersection testing module. There may be provided an integrated circuit definition dataset that, when processed in an integrated circuit manufacturing system, configures the system to manufacture an intersection testing module. There may be provided a non-transitory computer readable storage medium having stored thereon a computer readable description of an intersection testing module that, when processed in an integrated circuit manufacturing system, causes the integrated circuit manufacturing system to manufacture an integrated circuit embodying an intersection testing module.

There may be provided an integrated circuit manufacturing system comprising: a non-transitory computer readable storage medium having stored thereon a computer readable description of the intersection testing module; a layout processing system configured to process the computer readable description so as to generate a circuit layout description of an integrated circuit embodying the intersection testing module; and an integrated circuit generation system configured to manufacture the intersection testing module according to the circuit layout description.

There may be provided computer program code for performing any of the methods described herein. There may be provided non-transitory computer readable storage medium having stored thereon computer readable instructions that, when executed at a computer system, cause the computer system to perform any of the methods described herein.

The above features may be combined as appropriate, as would be apparent to a skilled person, and may be combined with any of the aspects of the examples described herein.

BRIEF DESCRIPTION OF THE DRAWINGS

Examples will now be described in detail with reference to the accompanying drawings in which.

Figure 1:
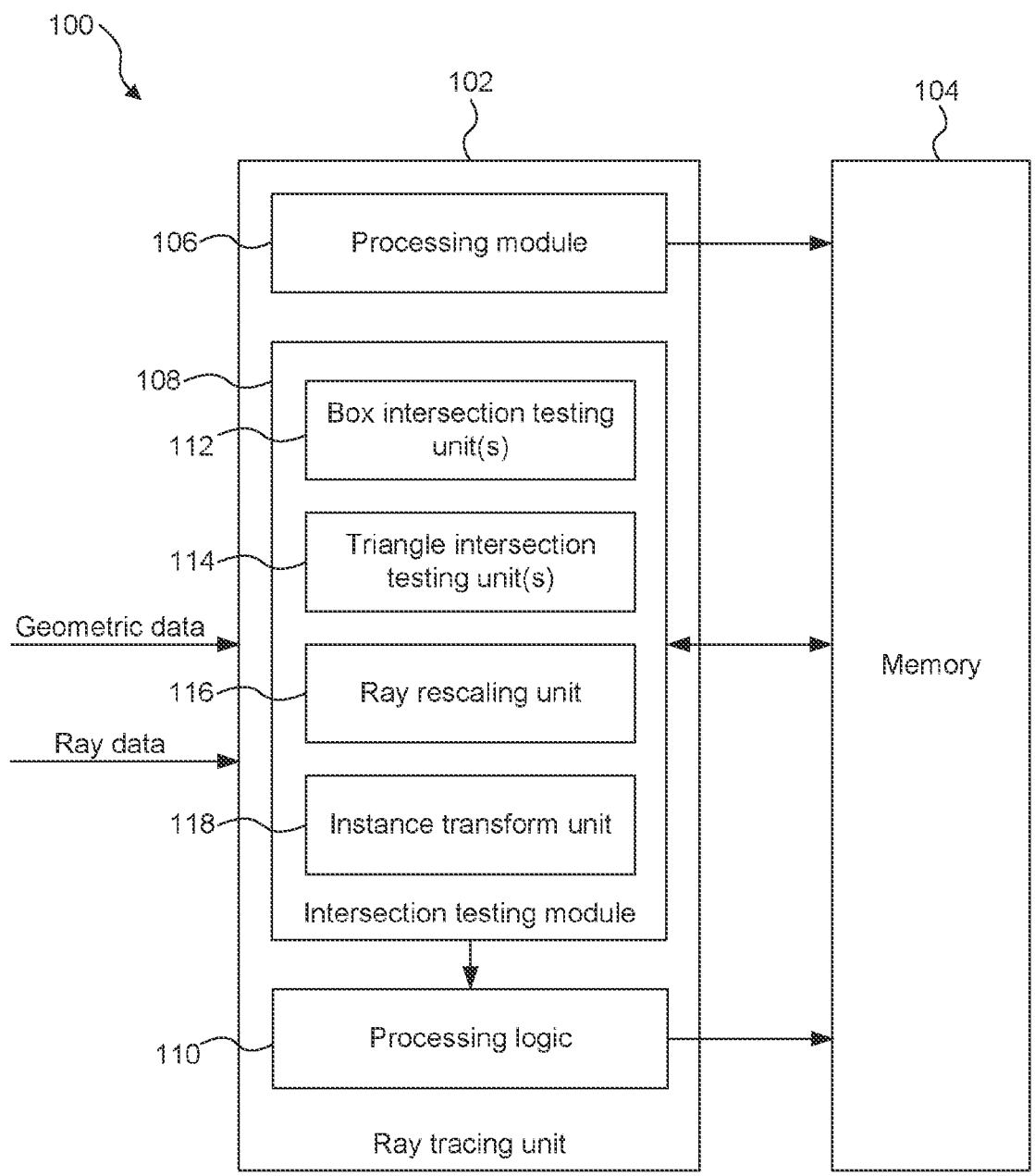
FIG. 1 shows a ray tracing system according to examples described herein.

The accompanying drawings illustrate various examples. The skilled person will appreciate that the illustrated element boundaries (e.g., boxes, groups of boxes, or other shapes) in the drawings represent one example of the boundaries. It may be that in some examples, one element may be designed as multiple elements or that multiple elements may be designed as one element. Common reference numerals are used throughout the figures, where appropriate, to indicate similar features.

DETAILED DESCRIPTION

The following description is presented by way of example to enable a person skilled in the art to make and use the invention. The present invention is not limited to the embodiments described herein and various modifications to the disclosed embodiments will be apparent to those skilled in the art.

Embodiments will now be described by way of example only.

Even when an acceleration structure is used, the amount of work involved in performing intersection testing in a ray tracing system is still very large. For example, ray tracing may be used for rendering an image of a 3D scene, where the image may have of the order of a million pixels. The pixel colour values are derived from some distribution of samples, associated with points in the image plane (typically, there is a one-to-one correspondence between pixel and sample location, but regions of an image may have a higher or lower sample density or may otherwise be independent of the arrangement of pixels). In the context of ray tracing, the samples are themselves associated with a distribution (in the statistical sense) of primary rays parameterised by the neighbourhood of each sample location. In the simplest example, a single primary ray is traced for each sample and used to determine its result. In other examples, multiple rays may be generated in accordance with the distribution (e.g. stochastic sampling) and the result derived from some accumulation or combination of the individual primary rays. When it is determined that a ray intersects with an object in the scene, a shader can be executed which may result in the emission of another ray (i.e. a "secondary ray") into the scene. Each primary ray may result in the emission of many secondary rays, which are all traced through the scene to determine their intersections. Therefore, it would not be unusual for there to be tens or hundreds of millions of rays traced through a scene for rendering an image. The complexity of scenes to be rendered tends to increase as graphics rendering technology develops, so it would not be unusual for there to be thousands of objects in a scene, each of which may be represented by many primitives. Furthermore, the images being rendered may represent frames of a sequence of frames which are to be rendered in real-time, e.g. for a display to a user in real-time. For example, the user may be playing a game wherein the rendered images represent a users view of the 3D scene as the user plays the game. In order for the sequence of frames to appear like a continuous stream of video data, many frames may be rendered per second, e.g. 24, 30 or 60 frames per second to give some examples. It can therefore be appreciated that the work involved in performing intersection testing in a ray tracing system to render scenes to be output in real-time is vast.

One way to overcome this problem, and to perform ray tracing to render scenes to be output in real-time would be to have one or more supercomputers to perform all of the processing. This could be considered to be a 'brute force' approach. However, as well as an aim to have high performance (to perform ray tracing to render scenes to be output in real-time), there are also competing aims of reducing the size (e.g. silicon area) and power consumption of the ray tracing system. For example, there may be an aim to implement the ray tracing system on a mobile device, such as a tablet or smartphone, for which the acceptable size and power consumption may be much lower than for a supercomputer. As such, when designing a ray tracing system, there may be a trade-off between performance, power consumption and area. Depending on how this trade-off is implemented, examples described herein may allow the performance to be increased without a significant increase to the power consumption and area (compared to the prior art described above in the background section). Alternatively, in a different implementation of the trade-off, examples described herein may allow the power consumption and/or size of the ray tracing system to be decreased without significantly decreasing the performance of the ray tracing system (compared to the prior art described above in the background section). Different implementations can be designed to target different points in the trade-off between performance, power consumption and silicon area.

As described above, testing rays for intersection with Axis Aligned Bounding Boxes (AABBs), which correspond with nodes of an acceleration structure, is an extremely frequent operation in a ray tracing system. In particular, the intersection testing of rays with bounding volumes (i.e. determining whether a ray intersects an axis-aligned box) usually accounts for most of the intersection tests that are performed to render an image of a scene using ray tracing. Therefore, any optimizations that can be made to the way in which the intersection tests are performed can be very useful for optimizing the ray tracing system in terms of reducing the latency, power consumption and physical size of the ray tracing system.

In the two examples given in the background section, six tests (plus minimum and maximum distance tests) are performed to determine whether a ray intersects an axis-aligned box. However, according to examples described herein, the number of tests that need to be performed to determine whether a ray intersects an axis-aligned box is reduced. In particular, in examples described below in which a box is described as a centre position and three halfwidths, the number of tests is reduced to three (plus minimum and maximum distance tests). Furthermore, in examples described herein, some of the components of the basis vectors, when expressed in the space-coordinate system, are zero. Furthermore, the ray may be rescaled such that the largest component(s) of the ray direction vector have unit magnitude. The choice of the ray coordinate system and the rescaling of the ray in examples described herein may make two thirds of the tests mathematically cheaper due to scale values being either 1.0 or 0.0. This can be achieved by performing a small amount of pre-calculation that is constant for the ray, so the cost of performing this pre-calculation can be ameliorated because it is performed once for a ray and then can be used in many intersection tests involving that ray. For example, where the ray direction vector D has components $D_x$, $D_y$ and $D_z$, values of $$\frac{D_x}{D_z} \text{ and } \frac{D_y}{D_z}$$

(or values of $$\frac{D_x}{|D_z|} \text{ and } \frac{D_y}{|D_z|})$$

for a ray may be pre-computed and may be stored. As described in more detail below, the axes can be swapped (e.g. permuted) to ensure that $D_z$ is the major component of the ray direction vector, i.e. $|D_z| \geq |D_x|$ and $|D_z| \geq |D_y|$. Since any valid ray direction vector has a non-zero magnitude this means that $|D_z| > 0$. As another example, values of $$\frac{D_z}{D_x} \text{ and } \frac{D_z}{D_y}($$

or values of $$\frac{|D_z|}{D_x} \text{ and } \frac{|D_z|}{D_y})$$

for a ray may be pre-computed and may be stored, with $D_x$ and $D_y$ nonzero, or by using the concept of signed infinity, e.g. as defined in the IEEE floating point format, if $D_x$ or $D_y$ is zero. In some examples, values of zero can be replaced with non-zero values that are small enough to behave like zero in the operations described herein, and/or values of infinity can be replaced with finite values that are large enough to behave like infinity in the operations described herein, and these examples avoid having to treat some zeros and infinities as special cases, and also avoid at least some undefined results which can result from multiplying or dividing by zero or infinity. It is noted that the values of $$\frac{D_z}{D_x} \text{ and } \frac{D_z}{D_y}($$

or values of $$\frac{|D_z|}{D_x} \text{ and } \frac{|D_z|}{D_y})$$

have a modulus greater than or equal to 1. As another example, a value of $$\frac{1}{D_z}$$

for a ray may be pre-computed and may be stored. For box testing, we might just need the sign of $D_z$, so rather than storing $D_z$ or $$\frac{1}{D_z},$$

in some examples, just me sign or $D_z$ may be stored for use in the box testing. After these values have been pre-computed they can be used for performing intersection testing on the ray. The pre-computed values can be used for multiple intersection tests, which may be performed in parallel. In some examples, the pre-computed values are stored so that they can be read, rather than calculated for use in performing intersection testing on the ray. Examples described herein make use of symmetry in the tests to effectively do two tests for the cost of one, such that six tests (as in the prior art) can be reduced down to three tests in order to determine whether a ray intersects an axis-aligned box. Furthermore, choosing the ray coordinate system so that some of its coordinates are 0 (and in some examples rescaling the ray so that some of its coordinates are 1) makes the processing of the rays simpler to implement. Reducing the number of tests that need to be performed in order to determine whether a ray intersects an axis-aligned box, and/or simplifying the processing of the rays for determining whether a ray intersects a box, can reduce the latency, size and/or power consumption of an intersection testing module in a ray tracing system.

FIG. 1 shows a ray tracing system 100 comprising a ray tracing unit 102 and a memory 104. The ray tracing unit 102 comprises a processing module 106, an intersection testing module 108 and processing logic 110. The intersection testing module 108 comprises one or more box intersection testing units 112, one or more triangle intersection testing units 114, a ray rescaling unit 116 and an instance transform unit 118. It is noted that there may be more than one ray rescaling unit and/or more than one instance transform unit. In operation the ray tracing unit 102 receives geometric data defining objects within the 3D scene. The ray tracing unit 102 also receives ray data defining rays that are to be tested for intersection. The rays may be primary rays or secondary rays. The processing module 106 is configured to generate an acceleration structure based on the geometric data, and to send the acceleration structure to the memory 104 for storage therein. After the acceleration structure has been stored in the memory 104, the intersection testing module 108 can retrieve nodes (comprising data defining the axis-aligned boxes corresponding to the nodes) of the acceleration structure from the memory 104 to perform intersection testing of rays against the retrieved nodes. To avoid reading in the whole acceleration structure at a time, the intersection testing module 108 retrieves a subset of the boxes from one level of the acceleration structure from memory 104 at each stage, based on the results of previous intersection tests. The box intersection testing unit(s) 112 perform intersection tests to determine whether or not a ray intersects each of the bounding boxes corresponding to nodes of the acceleration structure (where a miss can cull vast swathes of the hierarchical acceleration structure). If it is determined that a leaf node is intersected then the triangle intersection testing unit(s) 114 perform one or more triangle intersection tests to determine which object(s) (if any) the ray intersects. The results of the intersection tests indicate which object in the scene a ray intersects, and the results may also indicate a position on the object at which the ray intersects the object (e.g. Barycentric coordinates), may also indicate a distance along the ray that the intersection occurs, and may also indicate the perceived orientation of the object from the ray's point of view (e.g., clockwise/anticlockwise or front/back facing). In some instances, the intersection determination may be based on whether the distance along the ray that the intersection occurs is between the minimum and maximum clipping distances for the ray ($t_{min}$ and $t_{max}$). In some instances, the intersection determination may be based on the perceived orientation of the object (e.g., for back-face culling). The results of the intersection testing are provided to the processing logic 110. The processing logic 110 is configured to process the results of the intersection testing to determine rendered values representing the image of the 3D scene. The rendered values determined by the processing logic 110 can be passed back to the memory 104 for storage therein to represent the image of the 3D scene.

In the two prior art approaches mentioned in the background section above, when performing intersection testing of a ray with an axis-aligned box, the ray is defined in terms of components in a space-coordinate system in which the axis-aligned box is defined. However, in examples described herein, a ray-coordinate system is derived relative to the ray itself, and the box can be mapped onto the ray coordinate system. The term "space-coordinate system" is used herein to refer to the coordinate system in which the axis-aligned box is defined, and in which the edges of the box are aligned with the basis vectors defining the axes of the coordinate system. The "space-coordinate system" may be a world space coordinate system or an instance space coordinate system. In most of the examples described herein the space-coordinate system is a three-dimensional coordinate system, and the box is a three-dimensional axis-aligned box.

The term "ray-coordinate system" is used herein to refer to a coordinate system that is specific to a ray, and which has its origin at the origin of the ray. It is noted that in the examples described in detail herein the origin of the ray-coordinate system is the origin of the ray, but in other examples, any point along the ray's line could be used as the origin of the ray-coordinate system, with a suitable adjustment to the minimum and maximum clipping distances for the ray ($t_{min}$ and $t_{max}$). The ray-coordinate system has three basis vectors. A first of the basis vectors is aligned with the ray direction. A second and third of the basis vectors are both orthogonal to the first basis vector, and are not parallel with each other. In examples described herein the second and third basis vectors of the ray-coordinate system are not, in general, orthogonal to each other, although in some examples it is possible that they are orthogonal to each other. Furthermore, in examples described herein, the second and third basis vectors of the ray-coordinate system have a zero as one component when expressed in the space-coordinate system. In some examples, the second and third of the basis vectors of the ray-coordinate system have a value of ±1 (i.e. a magnitude of 1) for one component when expressed in the space-coordinate system.

In examples described herein, the ray-coordinate system is used by the intersection testing module 108 to perform intersection testing to determine whether a ray intersects a box, wherein the box is an axis-aligned box in the space-coordinate system. A result of performing the intersection testing for the ray is output from the intersection testing module 108 for use by the ray tracing system, e.g. for use in determining which shader program(s) is(are) executed for the ray by the processing logic 110.

One or more position vectors defining the position of the box are translated for use in performing the intersection testing using the ray-coordinate system by subtracting the ray origin from the one or more position vectors defining the position of the box. In one example, the position of the box is defined by: (i) a first position vector defining a point with the minimum component values of the box in each of the three dimensions of the space-coordinate system, and (ii) a second position vector defining a point with the maximum component values of the box in each of the three dimensions of the space-coordinate system. In another example, the position of the box is defined by a position vector defining a centre point of the box in the space-coordinate system. The size of the box in each dimension may be defined by widths or half widths in each dimension in the space-coordinate system. Subtracting the ray origin from the position vector(s) defining the position of the box means that the position of the box is then defined relative to the origin of the ray. By shifting the position of the box by the ray origin first, all relative error in downstream calculations is centred around the ray origin. Assuming that the same is true for the triangle tester, this makes guaranteeing conservatism (i.e., no false negatives) easier.

Figure 2:
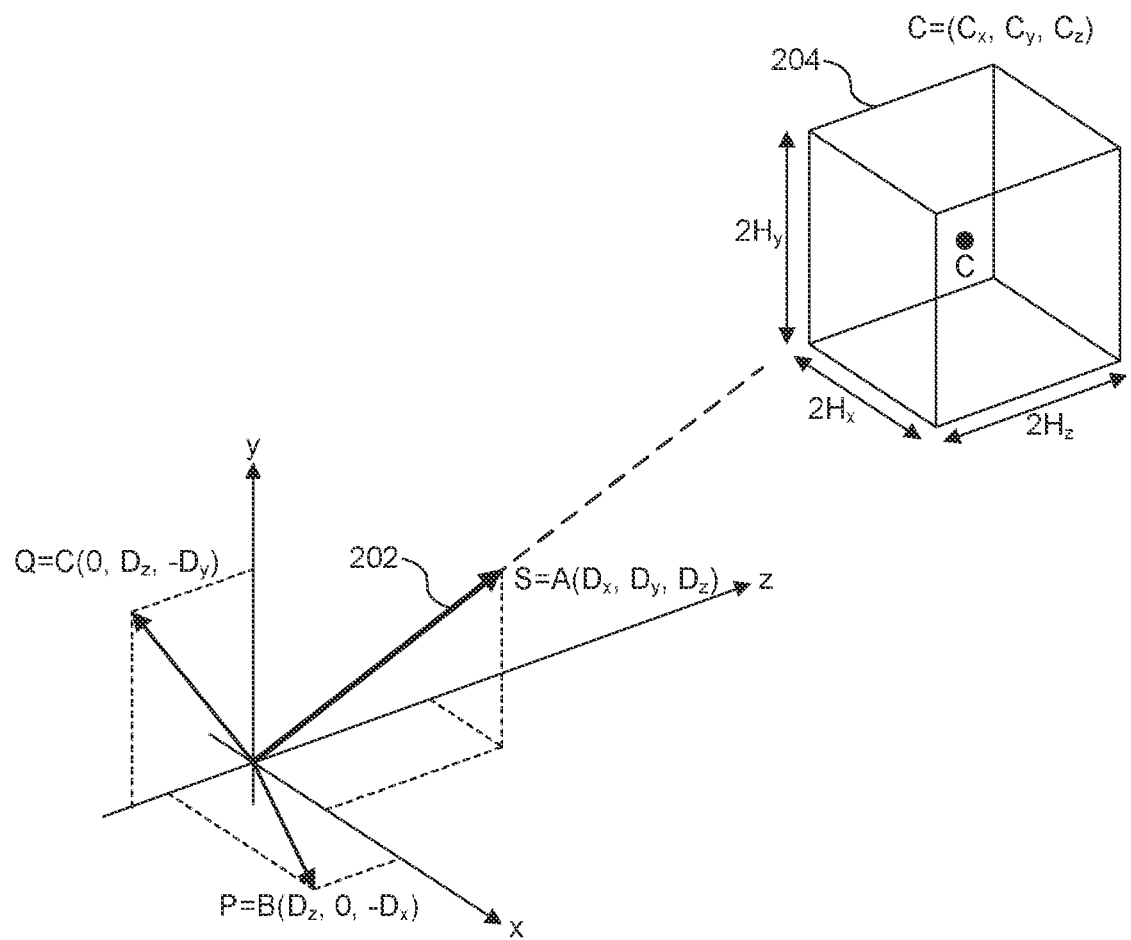
FIG. 2 shows a ray and a box, the basis vectors of a space-coordinate system, and the basis vectors of a ray-coordinate system.

FIG. 2 illustrates a ray 202 and a box 204. As described above, the ray 202, r(t), can be represented as r(t)=O+Dt, where O is a vector representing the origin of the ray and D is the direction vector of the ray, where O=($O_x$, $O_y$, $O_z$) and D=($D_x$, $D_y$, $D_z$). The x, y and z basis vectors of the space-coordinate system are shown in FIG. 2. The box 204 is an axis-aligned box with respect to the x, y and z basis vectors of the space-coordinate system. As described above, the space-coordinate system could be a world space coordinate system of a scene being rendered, or the space-coordinate system could be the instance space coordinate system of an instanced set of geometry within a scene being rendered. The origin of the ray-coordinate system that is used in the intersection testing is the origin of the ray. The position vector(s) defining the box 204 is(are) translated by subtracting the ray origin from the position vector(s).

Furthermore, in some examples described herein, the x, y and z components of the ray and the axis-aligned box are selectively permuted and/or reversed, such that $D_z \geq D_x \geq 0$ and $D_z \geq D_y \geq 0$, before performing intersection testing (noting that in these examples we must also have $D_z > 0$ for valid ray directions). The selective reversing of the axes may be performed such that the ray direction vector will point in the octant of the space-coordinate system which has positive values for x, y and z, and the selective permutation of the axes is performed such that $D_z$ will be the major component of the ray direction, i.e. $|D_z| \geq |D_x|$ and $|D_z| \geq |D_y|$.

FIG. 2 shows the ray 202 and the box 204 in relation to the basis vectors after the translation and the selective permutation of the axes of the ray and the box have been performed, such that the origin of the ray is at the origin of the coordinate system, and such that $|D_z| \geq |D_x|$ and $|D_z| \geq |D_y|$. This ensures that $D_z$ is non-zero because a valid ray cannot have $D_x = D_y = D_z = 0$.

The basis vectors of the ray-coordinate system are represented as P, Q and S in FIG. 2. The first basis vector, S, of the ray-coordinate system is set to be along the direction of the ray, $S = A(D_x, D_y, D_z)$, where A is a scalar value. In some examples, $$A = \frac{1}{D_z}, \text{ such that } S = \left(\frac{D_x}{D_z}, \frac{D_y}{D_z}, 1\right).$$

As an example (which may be referred to as a "first example" below), the second and third basis vectors, P and Q, may be defined to be $$P = \left(1, 0, -\frac{D_x}{D_z}\right) \text{ and } Q = \left(0, 1, -\frac{D_y}{D_z}\right).$$

More generally, and as shown in the example in FIG. 2, $P = B(D_z, 0, -D_x)$ and $Q = C(0, D_z, -D_y)$, where B and C are any non-zero scalar values. To give some other examples, $$B \text{ could be } \pm 1, \pm \frac{1}{D_z}, \pm \frac{1}{|D_z|}, \pm \frac{1}{D_x}, \pm \frac{1}{|D_x|}, \pm \text{sgn}(D_z), \text{ or } \pm \text{sgn}(D_x)$$

or any product of these non-zero scalar values e.g $$\frac{1}{D_x D_z}, \text{ and } C \text{ could be } \pm 1, \pm \frac{1}{D_z}, \pm \frac{1}{|D_z|}, \pm \frac{1}{D_y} \text{ or}$$

$$\pm \frac{1}{|D_y|}, \pm \text{sgn}(D_z), \text{ or } \pm \text{sgn}(D_y)$$

or any product of these non-zero scalar values e.g.

$$\frac{1}{D_y D_z}.$$

It is noted that, for a non-zero value α, $\text{sgn}(\alpha) = +1$ if α is positive, and $\text{sgn}(\alpha) = -1$ if α is negative. If $\alpha = 0$ then $\text{sgn}(\alpha)$ may be $+1$ or $-1$ depending on the sign bit of the floating point representation of α. It is noted that standard floating point representations allow both $+0$ and $-0$ to be represented separately, and that unsigned 0 is usually identified with $+0$. In other words, if the adopted number system distinguishes between $-0$ and $+0$ (as is the case for the IEEE floating point system) then, as an example, $\text{sgn}(+0) = +1$ and $\text{sgn}(-0) = -1$, otherwise $\text{sgn}(0) = 1$. A set of common values for A might be the union of the sets of common values for B and C. It is noted that S is orthogonal to P and to Q, which can be seen in that $P \cdot S = Q \cdot S = 0$. However, depending on the values of $D_x$ and $D_y$, P and Q are not necessarily orthogonal to each other. For example, unless $D_x$ or $D_y$ is zero then P and Q will not be orthogonal to each other. As described above, P and Q are not parallel to each other, e.g. P and Q are at least far enough from being parallel to each other to not cause issues due to loss in rounding, otherwise the system might degenerate into a 1D scenario. It is noted that $D_z$ cannot be zero because of the selective permutation of the axes such that $D_z$ is the major component of the ray direction and because a valid ray direction vector must have a non-zero magnitude in order to define a line. Therefore, of the possible components of ray basis vector P and Q, the values of $$\frac{D_x}{D_z} \text{ and } \frac{D_y}{D_z}$$

are always well-defined numb and have a magnitude in the range from zero to one inclusive, and the values of $$\frac{D_z}{D_x} \text{ and } \frac{D_z}{D_y}$$

have a magnitude in the range from one to positive infinity (inclusive).

The choice of the scalar values A, B and C can affect the handedness of the system. In FIG. 2, the world (or instance) space axes form a left-handed system. If we order the ray-space axes as $(X', Y', Z') = (P, Q, S)$, then they form a system of the same handedness (this will be the case if and only if the major axis is positive). Each scalar value (from the scalar values A, B and C) that is negative flips the handedness of the system, e.g. from left-handed to right-handed. If an even number of the scalar values A, B and C are negative, then they cancel out and we return to a left-handed system.

In another example (not shown in the Figures, and which is referred to as a "second example" below), the second and third basis vectors, P and Q, are defined to be $$P = \left(-1, 0, +\frac{D_x}{D_z}\right) \text{ and } Q = \left(0, -1, +\frac{D_y}{D_z}\right).$$

In this example (not shown in FIG. 2), $$B = C = -\frac{1}{D_z}.$$

Generally, these two examples can be described as the second basis vector, P, being defined to be $$P = \left(\pm 1, 0, \mp \frac{D_x}{D_z}\right), \text{ i.e. either } P = \left(1, 0, -\frac{D_x}{D_z}\right) \text{ or}$$

$$P = \left(-1, 0, +\frac{D_x}{D_z}\right).$$

And the third basis vector, Q, being defined to be $$Q = \left(0, \pm 1, \mp \frac{D_y}{D_z}\right), \text{ i.e. either } Q = \left(0, 1, -\frac{D_y}{D_z}\right) \text{ or}$$

$$Q = \left(0, -1, +\frac{D_y}{D_z}\right).$$

In another example (not shown in the Figures, and which is referred to as a "third example" below), $$B = \pm \frac{1}{|D_z|} \text{ and } C = \pm \frac{1}{|D_z|}.$$

For example, the second basis vector, P, may be defined to be $$P = \left(\pm \text{sgn}(D_z), 0, \mp \text{sgn}(D_z)\frac{D_x}{D_z}\right),$$

i.e. either $P = \left(+\text{sgn}(D_z), 0, -\text{sgn}(D_z)\frac{D_x}{D_z}\right)$ or $$P = \left(-\text{sgn}(D_z), 0, +\text{sgn}(D_z)\frac{D_x}{D_z}\right),$$

and the third basis vector, Q, may be defined to be $$Q = \left(0, \pm \text{sgn}(D_z), \mp \text{sgn}(D_z)\frac{D_y}{D_z}\right),$$

i.e. either $Q = \left(0, +\text{sgn}(D_z), -\text{sgn}(D_z)\frac{D_y}{D_z}\right)$ or $$Q = \left(0, -\text{sgn}(D_z), +\text{sgn}(D_z)\frac{D_y}{D_z}\right).$$

It is noted that $$\text{sgn}(D_i)D_i = |D_i|, \text{sgn}(D_i)\frac{1}{D_i} = \frac{1}{|D_i|}, \frac{D_i}{\text{sgn}(D_i)} = |D_i|, \text{ and}$$

$$\frac{1}{\text{sgn}(D_i)D_i} = \frac{1}{|D_i|}.$$

In another example (not shown in the Figures, and which is referred to as a "fourth example" below), $B = \pm 1$ and $C = \pm 1$. For example, the second basis vector, P, may be defined to be $P = (\pm D_z, 0, \mp D_x)$, i.e. either $P = (+D_z, 0, -D_x)$ or $P = (-D_z, 0, +D_x)$, and the third basis vector, Q, may be defined to be $Q = (0, \pm D_z, \mp D_y)$, i.e. either $Q = (0, +D_z, -D_y)$ or $Q = (0, -D_z, +D_y)$.

In another example (not shown in the Figures, and which is referred to as a "fifth example" below), $$B = \pm \frac{1}{|D_x|} \text{ and } C = \pm \frac{1}{|D_y|}.$$

For example, the second basis vector, P, may be defined to be $$P = \left(\pm \text{sgn}(D_x)\frac{D_z}{D_x}, 0, \mp \text{sgn}(D_x)\right),$$

i.e. either $P = \left(+\text{sgn}(D_x)\frac{D_z}{D_x}, 0, -\text{sgn}(D_x)\right)$ or $$P = \left(-\text{sgn}(D_x)\frac{D_z}{D_x}, 0, +\text{sgn}(D_x)\right),$$

and the third basis vector, Q, may be defined to be $$Q = \left(0, \pm \text{sgn}(D_y)\frac{D_z}{D_y}, \mp \text{sgn}(D_y)\right),$$

i.e. either $Q = \left(0, +\text{sgn}(D_y)\frac{D_z}{D_y}, -\text{sgn}(D_y)\right)$ or $$Q = \left(0, -\text{sgn}(D_y)\frac{D_z}{D_y}, +\text{sgn}(D_y)\right).$$

In other examples (not shown in the Figures, and which are referred to as "sixth examples" below), $$B = \pm \frac{1}{D_x} \text{ and } C = \pm \frac{1}{D_y}.$$

Therefore, the second basis vector, P, may be defined to be $$P = \left(\pm \frac{D_z}{D_x}, 0, \mp 1\right), \text{ i.e. either } P = \left(+\frac{D_z}{D_x}, 0, -1\right) \text{ or}$$

$$P = \left(-\frac{D_z}{D_x}, 0, +1\right),$$

and the third basis vector, Q, may be defined to be $$Q = \left(0, \pm \frac{D_z}{D_y}, \mp 1\right), \text{ i.e. either}$$

$$Q = \left(0, +\frac{D_z}{D_y}, -1\right) \text{ or } Q = \left(0, -\frac{D_z}{D_y}, +1\right).$$

Since $D_z$ is the major component of the ray direction vector, it is possible that $D_x$ or $D_y$ may be zero. Therefore, in these examples, care needs to be taken when handling the values of $$\pm \frac{D_z}{D_x} \text{ and } \pm \frac{D_z}{D_y}.$$

In one approach, the values of $D_x$ or $D_y$ may be perturbed by some small amount so that they are never exactly zero. For example, values of zero can be replaced with non-zero values that are small enough to behave like zero in the operations described herein.

In other examples (not shown in the Figures, and which are referred to as "seventh examples" below), $$B = \pm \frac{1}{D_x D_z} \text{ and } C = \pm \frac{1}{D_y D_z}.$$

Therefore, the second basis vector, P, may be defined to be $$P = \left(\pm\frac{1}{D_x}, 0, \mp\frac{1}{D_z}\right), \text{i.e. either}$$

$$P = \left(+\frac{1}{D_x}, 0, -\frac{1}{D_z}\right) \text{ or } P = \left(-\frac{1}{D_x}, 0, +\frac{1}{D_z}\right).$$

and the third basis vector, Q, may be defined to be $$Q = \left(0, \pm\frac{1}{D_y}, \mp\frac{1}{D_z}\right), \text{i.e. either}$$

$$Q = \left(0, +\frac{1}{D_y}, -\frac{1}{D_z}\right) \text{ or } Q = \left(0, -\frac{1}{D_y}, +\frac{1}{D_z}\right).$$

Since $D_z$ is the major component of the ray direction vector, it is possible that $D_x$ or $D_y$ may be zero. Therefore, in these examples, care needs to be taken when handling the values of $$\pm\frac{1}{D_x} \text{ and } \pm\frac{1}{D_y}.$$

As described above, in one approach, the values of $D_x$ or $D_y$ may be perturbed by some small amount so that they are never exactly zero. For example, values of zero can be replaced with non-zero values that are small enough to behave like zero in the operations described herein.

The example basis vectors given in the second, third, fourth and fifth examples described above all have consistent handedness, whereas the handedness of the basis vectors given in the sixth and seventh examples described above may either have consistent or opposite handedness, depending on the signs of $D_x$ and $D_y$.

In another example (not shown in the Figures), B=±sgn ($D_z$) and C=±sgn($D_z$). For example, the second basis vector, P, may be defined to be P=(±|$D_z$|, 0, ∓sgn($D_z$)$D_x$), i.e. either P=(+|$D_z$|, 0, −sgn($D_z$)$D_x$) or P=(−|$D_z$|0, +sgn($D_z$)$D_x$), and the third basis vector, Q, may be defined to be Q=(0, ±|$D_z$|, ∓sgn($D_z$)$D_y$), i.e. either Q=(0, +|$D_z$|, −sgn($D_z$)$D_y$) or Q=(0, −|$D_z$|, +sgn($D_z$)$D_y$).

In another example (not shown in the Figures), B=±sgn ($D_x$) and C=±sgn($D_y$). For example, the second basis vector, P, may be defined to be P=(±sgn($D_x$)$D_z$, 0, ∓|$D_x$|), i.e. either P=(+sgn($D_x$)$D_z$, 0, −|$D_x$|) or P=(−sgn($D_x$)$D_z$, 0, +|$D_x$|), and the third basis vector, Q, may be defined to be Q=(0, ±sgn($D_y$)$D_z$, ∓|$D_y$|), i.e. either Q=(0, +sgn($D_y$)$D_z$, −|$D_y$|) or Q=(0, −sgn($D_y$)$D_z$, +|$D_y$|).

In all of these examples: (i) S is orthogonal to P and to Q, (ii) P and Q are not parallel with each other, and (iii) P and Q have a zero as one component when expressed in the space-coordinate system. Furthermore, in some of these examples, P and Q have a value of ±1 as one component when expressed in the space-coordinate system. Conditions (i) and (ii) together imply that P,Q and S are always linearly independent. This implies that they are also spanning, and so do form a basis. That they form a non-degenerate basis is also demonstrated by the determinant never being zero for a valid (i.e. nonzero) ray direction.

A "reciprocal basis" is one where in the basis vectors, P=B($D_z$, 0, −$D_x$) and Q=C(0, $D_z$, −$D_y$), B is a function of $$\frac{1}{D_x}$$

and c, is a function of $$\frac{1}{D_y}.$$

in other words, B is a simplified fraction with $D_x$ in its denominator, and C is a simplified fraction with $D_y$ in its denominator. For example, a reciprocal basis may have $$B = \frac{1}{D_x} \text{ and } C = \frac{1}{D_y}, \text{ such that } P = \left(\frac{D_z}{D_x}, 0, -1\right) \text{ and}$$

$$Q = \left(0, \frac{D_z}{D_y}, -1\right).$$

As another example, a reciprocal basis may have $$B = \frac{1}{D_x D_z} \text{ and } C = \frac{1}{D_y D_z},$$

$$\text{such that } P = \left(\frac{1}{D_x}, 0, -\frac{1}{D_z}\right) \text{ and } Q = \left(0, \frac{1}{D_y}, -\frac{1}{D_z}\right).$$

One advantage of using a reciprocal basis is that each reciprocal may be evaluated to some accuracy (usually less accurate than comparable floating point operations) and then those evaluated values may be treated as if they were exact, in essence perturbing the direction of the ray direction for the sake of improving the accuracy of all intersection testers (improving consistency across the board).

The process of performing intersection testing for a ray with respect to a box (e.g. an axis aligned box) may involve dividing a value (e.g. a component value that is constant on the plane defining a face of an axis aligned box) by a component of the ray direction vector (e.g. $D_x$, $D_y$ or $D_z$). For example, an indication of the intersection distance for an intersection between a ray and a plane defining a face of an axis aligned box can be found by determining the value of t for the ray at the intersection point (where the ray is defined as r=O+tD). As is known in the art, division is generally a more complex operation than multiplication to implement, such that division operations tend to be slower and consume more power than corresponding multiplication operations, and hardware (e.g. fixed function circuitry) configured to perform division operations tends to be larger (i.e. have a larger silicon area) than hardware configured to perform corresponding multiplication operations. If a reciprocal basis is used then the process of dividing a value (e.g. a component value that is constant on the plane defining a face of an axis aligned box) by a component of the ray direction vector (e.g. $D_x$, $D_y$ or $D_z$) involves a multiplication operation (e.g. a multiplication involving $$\frac{1}{D_x}, \frac{1}{D_y} \text{ or } \frac{1}{D_z}\right)$$

rather than a division operation. As such, the use of a reciprocal basis can lead to efficiencies (e.g. in terms of processing latency, power consumption and silicon area) compared to using a non-reciprocal basis for the box intersection testing unit(s) 112. It is noted that the calculation of the ray components in a reciprocal basis may be more complex than the calculation of the ray components in a non-reciprocal basis. However, the calculation of the reciprocal ray components can be performed once, and then the calculated reciprocal ray components can be used many times (e.g. hundreds of times) by the box intersection testing unit(s) 112 so the cost of calculating the reciprocal ray components is amortized over many intersection tests involving the ray. As such, the efficiency of the intersection testing module 108 (e.g. in terms of processing latency, power consumption and silicon area) tends to be improved by using a reciprocal basis compared to using a non-reciprocal basis.

Using a reciprocal basis may also be beneficial in the triangle intersection testing unit(s) 114 because it provides more flexibility in how an intersection distance, if required, is calculated. In particular, if a point of intersection (relative to the ray basis coordinate system) $(p_x, p_y, p_z)$ is determined, for example via barycentric interpolation, then the intersection parameter t may be alternatively computed as $$\frac{1}{D_x}p_x, \frac{1}{D_y}p_y \text{ or } \frac{1}{D_z}p_z.$$

This may provide superior error characteristics if, for example, the component is selected corresponding to the axis for which a given convex polygon's components have the smallest range. This is in contrast with a non-reciprocal basis for which it is less cost effective to perform a calculation involving the reciprocals $$\frac{1}{D_x} \text{ and } \frac{1}{D_y}$$

without additional per ray storage. Pre-computing these additional terms would also potentially sacrifice some of the consistency in the definition of the ray since the computed reciprocals could not in general be treated as exact.

Using the ray-coordinate system with basis vectors as described in the examples above can simplify some of the processing involved in intersection testing. In particular, if a basis vector has a zero as a component value then a multiply and/or add operation (e.g. as used for performing a dot product or a cross product) involving that basis vector will not include a multiply and/or an add operation for the component which is zero, thereby reducing the number and/or complexity of operations that need to be performed. Similarly, if a basis vector has ±1 as a component value then a multiply and/or add operation (e.g. as used for performing a dot product or a cross product) involving that basis vector will not include a multiply operation for the component which is ±1, thereby reducing the number and/or complexity of operations that need to be performed. Reducing the number of operations that are performed will tend to reduce the latency and power consumption of the intersection testing module 108 and, additionally, reducing the complexity of operations that are performed will tend to increase the accuracy. Furthermore, when the intersection testing module 108 is implemented in fixed function circuitry then reducing the number and/or complexity of operations that are performed will tend to reduce the size (i.e. the silicon area) of the intersection testing module 108. For example, the fixed function circuitry may comprise one or more multiply-and-add components (e.g. a fused singly rounded multiply-add unit) for performing multiplications and additions using the second and third basis vectors of the ray-coordinate system. In a singly rounded floating point implementation (i.e. rounding is applied to the exact final result to ensure a representable value is output), this is more accurate and typically smaller in area than a sum of products, multiply rounded (both products and sum). Its area may even be comparable to a less accurate multiply rounded implementation, which is less likely to be the case for more complex operations. Floating point add and multiply operations (unlike the real numbers they approximate) are not associative. Reducing the operations, which reduces the possible orderings, thus may have other benefits in terms of consistency of results.

In the main examples described herein the ray data for the rays has n=3 coefficients. However, in other examples, the ray data could have more than three coefficients. The construction of the ray coordinate system described can be applied to any dimension n≥2. For example, n basis vectors of the ray coordinate system can be defined where a first of the basis vectors of the ray coordinate system is aligned with the ray direction, and there are (n−1) other basis vectors which are orthogonal to the first basis vector. If n>2 then no pairing of the (n−1) other basis vectors are parallel. Furthermore, the (n−1) other basis vectors have zeros for (n−2) components when expressed in the space-coordinate system. The n basis vectors of the ray coordinate system form a basis of n-dimensional space (they are linearly independent and hence spanning). For example, in a four dimensional space, the ray direction vector may be $D=(D_w, D_x, D_y, D_z)$, and the four basis vectors of the ray coordinate system may be: $S=A(D_w, D_x, D_y, D_z)$, $P=B(D_z, 0, 0, -D_w)$ and $Q=C(0, D_z, 0, -D_x)$, $R=D(0, 0, D_z, -D_y)$, where in this example, the selective permutation of the axes ensures that $D_z$ is the major component of the ray direction vector, i.e. $|D_z|\geq|D_w|$, $|D_z|\geq|D_x|$ and $|D_z|\geq|D_y|$. In this example, A, B, C and D are nonzero scalars, and they may be chosen to make one of the coefficients unital, e.g. as described above in relation to the three dimensional examples. In this example, the four dimensions may correspond to three spatial dimensions and one temporal dimension.

Returning to the 3D case, in some examples, the ray and the box are transformed from the space-coordinate system into the ray-coordinate system, wherein the intersection testing is performed in the ray-coordinate system. Testing in the ray-coordinate system could be performed by determining if the ray intersects with the volume defined by the edges of the box as defined in the ray-coordinate system. However, in some other examples, a full transformation of the ray and the box into the ray-coordinate system does not need to be performed. In these other examples, e.g. the example described below with reference to the flow chart of FIG. 3, the ray-coordinate system is used for the intersection testing without fully transforming the box into the ray-coordinate system, i.e. without determining s, p and q components of the box along the S, P and Q axes of the ray-coordinate system. It is noted that defining the ray in the ray-coordinate system is trivial because its origin is at the origin of the ray-coordinate system and its direction is parallel to the S axis, such that its component values along the P and Q axes of the ray-coordinate system are zero.

In the examples described above, the axes are selectively permuted to ensure that $D_z$ is the major component of the ray direction vector. Furthermore, the axes may be selectively reversed (or "reflected") to ensure that all of the components of the ray direction vector are non-negative, i.e. $D_z>0$, $D_x \geq 0$ and $D_y \geq 0$. The selective reversing of the axes causes the ray direction vector to point into the octant of the space-coordinate system which has positive values for x, y and z. Since $D_z$ is the major component of the ray direction vector this means that $$\frac{D_x}{D_z} \text{ and } \frac{D_y}{D_z}$$

are in a range from 0 to 1 and it means that $$\frac{D_z}{D_x} \text{ and } \frac{D_z}{D_y}$$

are in an interval from 1 to positive infinity. After the selective permutation and selective reversing of the axes, $D_z \geq D_x \geq 0$ and $D_z \geq D_y \geq 0$.

Figure 3:
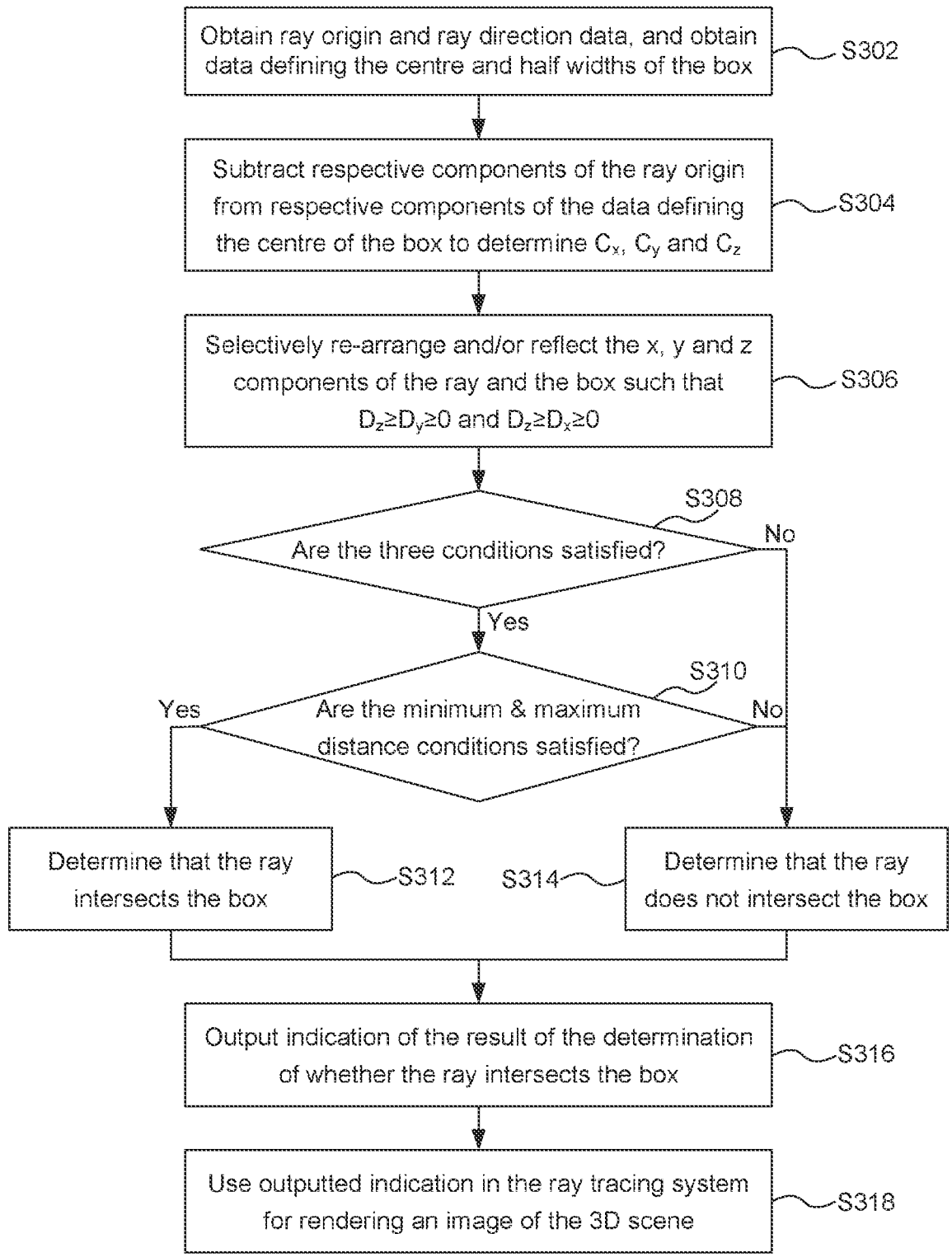
FIG. 3 is a flow chart for a method of performing intersection testing to determine whether a ray intersects a 3D axis-aligned box according to examples described herein.

FIG. 3 is a flow chart for a method of performing intersection testing to determine whether the ray 202 intersects the 3D axis-aligned box 204.

In step S302 data defining the ray 202 and the box 204 are obtained at the intersection testing module 108. In particular, data defining the components of the ray origin and the ray direction in the space-coordinate system are obtained. The data defining the ray origin may be the three components of the ray origin position in the space-coordinate system, $O_x$, $O_y$ and $O_z$. In the example shown in FIG. 3, the data defining the ray direction comprises the three components of the ray direction in the space-coordinate system, $D_x$, $D_y$ and $D_z$. Alternatively, as described above, some different values defining the ray direction may have been pre-computed and stored in a store, such that in step S302 the pre-computed values may be read. For example, three values may be read to define the ray direction data, and these three values may be $$\frac{D_x}{D_z}, \frac{D_y}{D_z} \text{ and } \frac{1}{D_z}.$$

In other examples, different pre-computed values may be read to define the ray direction, e.g. values of $$\frac{D_z}{D_x}, \frac{D_z}{D_y}$$

and $D_z$ may be read. As another example, values of $$\frac{D_z}{D_x}, \frac{D_z}{D_y} \text{ and } \frac{1}{D_z}$$

may be read. As another example, values of $$\frac{1}{D_x}, \frac{1}{D_y} \text{ and } \frac{1}{D_z}$$

may be read. In other examples, other values may be pre-computed and read which can be used to define the ray direction. It is noted that the box testing process described herein performed by the box intersection testing unit(s) 112 may use values of $$\frac{D_x}{D_z}, \frac{D_y}{D_z}$$

and $\text{sgn}(D_z)$ without determining a value of $D_z$ or $$\frac{1}{D_z},$$

whereas the triangle intersection testing process performed by the triangle intersection testing unit(s) 114 may determine a value of $D_z$ or $$\frac{1}{D_z}.$$

In the example described with reference to FIG. 3, data defining the x, y and z components of the centre position of the box and the half widths of the box ($H_x$, $H_y$ and $H_z$) in each of the three dimensions of the space-coordinate system is read in step S302.

In step S304, the intersection testing module 108 subtracts respective components of the ray origin ($O_x$, $O_y$ and $O_z$) from respective components of the read data defining the position of the centre of the box, to thereby determine components of the position of the centre of the box ($C_x$, $C_y$ and $C_z$) relative to the ray origin. FIG. 2 shows the box 204, wherein the component of the position of the centre of the box, $C=(C_x, C_y, C_z)$, are relative to the ray origin, and wherein the half widths of the box in each of the x, y and z dimensions of the space-coordinate system are given respectively by $H=(H_x, H_y, H_z)$.

In step S306 the x, y and z components of the data defining the ray and the box are selectively permuted and/or reversed by the intersection testing module 108 (e.g. by the ray rescaling unit 116), such that $D_z \geq D_x \geq 0$ and $D_z \geq D_y \geq 0$. The permutation of the axes may be thought of as rearranging the axes. In particular, a permutation of the axes comprises either a rotation of three axes, a transposition of two axes or the identity (i.e. not changing the axes). It is noted that a permutation involving a transposition of two axes will alter the handedness of the coordinate system, whereas a permutation that does not involve a transposition of two axes will not alter the handedness of the coordinate system. The permutation of the axes is performed so that the major component of the ray direction is $D_z$ (i.e. ensuring that $|D_z| \geq |D_x|$ and $|D_z| \geq |D_y|$). For example, if the original z component of the ray direction vector has a larger magnitude than the original x and y components of the ray direction vector then no permutation is used (which may be thought of as the permutation using the identity operation); if the original x component of the ray direction vector has a larger magnitude than the original y and z components of the ray direction vector then the permutation may comprise a rotation of the three axes such that the x components become the z components, the z components become the y components, and the y components become the x components; and if the original y component of the ray direction vector has a larger magnitude than the original x and z components of the ray direction vector then the permutation comprises a transposition of the y and z axes such that the y components become the z components, and the z components become the y components (and the x components stay as the x components). It would be possible to just perform the selective permutation in step S306 (i.e. not perform the selective reversing), but in the method described with reference to FIG. 3, the selective reversing of zero, one or more of the axes is performed so that the ray direction is into the octant with positive x, y and z. The "reversing" of the axes, may be referred to as "reflecting", "inverting" or "negating", and may involve changing the sign of all of the component values in the dimension along the axis in question. The data defining the ray comprises the ray origin and the ray direction, and the data defining the box comprises the position of the centre of the box relative to the ray origin and the half widths of the box in each dimension. It is noted that reversing an odd number of the axes reverses the perceived orientation of the geometry.

The position of any point in the box relative to the ray origin is given by:

$$\text{Box} = \left\{ \begin{pmatrix} C_x + iH_x \\ C_y + jH_y \\ C_z + kH_z \end{pmatrix} \ni |i| \leq 1, |j| \leq 1, |k| \leq 1 \right\}. \quad (1)$$

In step S308, the intersection testing module 108 (specifically the box intersection testing unit(s) 112) determines whether three conditions are satisfied. In particular, step S308 comprises determining whether a first condition is satisfied, wherein the first condition is, or is equivalent to, $$\left| C_x - C_z \frac{D_x}{D_z} \right| \leq H_z \frac{D_x}{D_z} + H_x.$$

Step S308 also comprises determining whether a second condition is satisfied, wherein the second condition is, or is equivalent to, $$\left| C_y - C_z \frac{D_y}{D_z} \right| \leq H_z \frac{D_y}{D_z} + H_y.$$

Step S308 also comprises determining whether a third condition is satisfied, wherein the third condition is, or is equivalent to, $$\left| C_x \frac{D_y}{D_z} - C_y \frac{D_x}{D_z} \right| \leq H_y \frac{D_x}{D_z} + H_x \frac{D_y}{D_z}.$$

It is noted that finding the magnitude of values which are represented in a floating point format can be performed essentially for free (i.e. with little or no latency or power consumption) because the magnitude of a floating point number is found by simply ignoring the sign bit of the floating point number. So determining the magnitudes of the values on the left hand sides of the three comparisons is simple to implement in hardware. It can also be noted that the values on the right hand side are all non-negative and that a custom floating-point addition operation may take advantage of this to reduce implementation costs. Furthermore, it is noted that these magnitudes on the left hand sides of the comparisons are not negative, and it is noted that the expressions on the right hand sides of the comparisons are also not negative because $D_x$, $D_y$, $D_z$, $H_x$, $H_y$ and $H_z$ are all non-negative values. Comparing two floating point values that are both known to be non-negative is cheaper to implement in hardware (e.g. it can be implemented in hardware with a smaller silicon area and/or with lower latency and/or lower power consumption) than a more general comparison of two floating point numbers in which the numbers could be either negative or positive.

Conditions that are "equivalent" may be mathematically equivalent (i.e. mathematically exactly the same) and/or substantially equivalent (i.e. will provide the same result according to the precision of the intersection testing module, even if they are not exactly mathematically equivalent). An example of a condition which is equivalent (specifically mathematically equivalent) to the first condition is $$\left| C_x - C_z \frac{D_x}{D_z} \right| - H_x \leq H_z \frac{D_x}{D_z}.$$

If all three of these conditions are satisfied then an infinitely long line aligned with the ray (e.g. a line defined by the ray direction vector) would intersect the box. If any of these three conditions is not satisfied then the method passes to step S314 in which the intersection testing module 108 determines that the ray does not intersect the box. It is noted that according to this method at most only three conditions need to be tested (rather than six as in the prior art) in order to determine whether an infinitely long line aligned with the ray would intersect the box. Therefore, the number of calculations that need to be performed in the intersection testing module is reduced compared to the prior art methods described in the background section above. As mentioned above, the ray-coordinate system is used to provide symmetry in the calculations being performed such that the number of calculations that need to be performed is halved, i.e. reduced from six to three. In some examples (e.g. in which the box intersection testing unit(s) 112 are implemented in hardware, e.g. in fixed function circuitry) the three comparisons may be performed independently, e.g. in parallel, wherein a 'miss' is determined for the ray with respect to the box if any one or more of the three comparisons is not satisfied. In other examples (e.g. in which the box intersection testing unit(s) 112 are implemented in software, e.g. modules of computer code executed on a processing unit) the three comparisons may be performed sequentially wherein a second of the conditions is checked only if a first condition is satisfied, and a third of the conditions is checked only if the first and second conditions are both satisfied. A miss is determined for the ray with respect to the box if any one or more of the three comparisons is not satisfied, but this second approach allows a miss to be determined without necessarily performing all three of the comparisons (if either the first or the second comparison is not satisfied).

An explanation of why these three conditions can be used to determine whether the ray intersects the box is now given with reference to the ray 202 and the box 204 shown in FIG. 2. The ray-coordinate system is used, and as described above, the first basis vector (S) is aligned with the direction of the ray, and the second and third basis vectors (P and Q) are both orthogonal to the first basis vector (S). Furthermore, the origin of the ray-coordinate system is at the origin of the ray. Therefore, any vector from the origin to any point on the ray's path must be orthogonal to the second and third basis vectors (P and Q). It is possible for the ray to intersect the box only if a point on the ray is also a point in the box. Therefore, it is possible for the ray to intersect the box only if a vector from the origin to a point in the box is orthogonal to both the second and third basis vectors (P and Q). If two vectors are orthogonal to each other then their dot product is zero. Equation (1) above defines the points in the box. In this example, the second basis vector of the ray-coordinate system $$P = \left(1, 0, -\frac{D_x}{D_z}\right)$$

and the third basis vector of the ray-coordinate system $$Q = \left(0, 1, -\frac{D_y}{D_z}\right).$$

Therefore, it is possible for the ray to intersect the box only if:

$$\begin{pmatrix} C_x + iH_x \\ C_y + jH_y \\ C_z + kH_z \end{pmatrix} \cdot \begin{pmatrix} 1 & 0 \\ 0 & 1 \\ -\frac{D_x}{D_z} & -\frac{D_y}{D_z} \end{pmatrix} = (0 \; 0) \quad (2)$$

For any values of i, j and k such that $|i| \leq 1$, $|j| \leq 1$ and $|k| \leq 1$. Expanding equation (2) out gives:

$$(C_x + iH_x) - (C_z + kH_z)\frac{D_x}{D_z} = 0 \text{ and}$$

$$(C_y + jH_y) - (C_z + kH_z)\frac{D_y}{D_z} = 0$$

Solving these equations for i and j gives:

$$i = \frac{C_z\frac{D_x}{D_z} + kH_z\frac{D_x}{D_z} - C_x}{H_x}$$

$$j = \frac{C_z\frac{D_y}{D_z} + kH_z\frac{D_y}{D_z} - C_y}{H_y}$$

For any solution to lie in the box, we know that $-1 \leq i \leq 1$ and $-1 \leq j \leq 1$, so this leads to:

$$-1 \leq \frac{C_z\frac{D_x}{D_z} + kH_z\frac{D_x}{D_z} - C_x}{H_x} \leq 1$$

$$-1 \leq \frac{C_z\frac{D_y}{D_z} + kH_z\frac{D_y}{D_z} - C_y}{H_y} \leq 1$$

These inequalities give us four bounds for k, which are denoted $k_{ilower}$, $k_{iupper}$, $k_{jlower}$ and $k_{jupper}$:

$$-H_x = C_z\frac{D_x}{D_z} + k_{ilower}H_z\frac{D_x}{D_z} - C_x$$

$$C_z\frac{D_x}{D_z} + k_{iupper}H_z\frac{D_x}{D_z} - C_x = H_x$$

$$-H_y = C_z\frac{D_y}{D_z} + k_{jlower}H_z\frac{D_y}{D_z} - C_y$$

$$C_z\frac{D_y}{D_z} + k_{jupper}H_z\frac{D_y}{D_z} - C_y = H_y$$

Solving for the different bounds of k gives:

$$k_{ilower}H_z\frac{D_x}{D_z} = C_x - C_z\frac{D_x}{D_z} - H_x$$

$$k_{iupper}H_z\frac{D_x}{D_z} = C_x - C_z\frac{D_x}{D_z} + H_x$$

$$k_{jlower}H_z\frac{D_y}{D_z} = C_y - C_z\frac{D_y}{D_z} - H_y$$

$$k_{jupper}H_z\frac{D_y}{D_z} = C_y - C_z\frac{D_y}{D_z} + H_y$$

Since the axes were selectively rearranged and/or reflected in step S306, it is known that $D_x$, $D_y$ and $D_z$ are all positive. The half widths $H_x$, $H_y$ and $H_z$ are also all positive. Therefore, it can be seen from the equations above that $k_{ilower} \leq k_{iupper}$ and $k_{jlower} \leq k_{jupper}$.

For any point in the box, $-1 \leq k \leq 1$, so the following four conditions must be met:

$$k_{ilower} \leq 1$$

$$-1 \leq k_{iupper}$$

$$k_{jlower} \leq 1$$

$$-1 \leq k_{jupper}$$

Putting these conditions into the equations for $k_{ilower}$, $k_{iupper}$, $k_{jlower}$ and $k_{jupper}$ given above gives:

$$C_x - C_z\frac{D_x}{D_z} \leq H_z\frac{D_x}{D_z} + H_x$$

$$-\left(H_z\frac{D_x}{D_z} + H_x\right) \leq C_x - C_z\frac{D_x}{D_z}$$

$$C_y - C_z\frac{D_y}{D_z} \leq H_z\frac{D_y}{D_z} + H_y$$

$$-\left(H_z\frac{D_y}{D_z} + H_y\right) \leq C_y - C_z\frac{D_y}{D_z}$$

By appreciating the symmetry in these four inequalities, it can be seen that these four conditions reduce to two conditions:

$$\left|C_x - C_z\frac{D_x}{D_z}\right| \leq H_z\frac{D_x}{D_z} + H_x$$

$$\left|C_y - C_z\frac{D_y}{D_z}\right| \leq H_z\frac{D_y}{D_z} + H_y$$

These are the first two conditions that are checked in step S308.

To derive the third condition, it is noted that a solution fork must satisfy:

$k_{ilower} \leq k \leq k_{iupper}$ $k_{jlower} \leq k \leq k_{jupper}$

And the ranges must overlap for there to be a valid solution for k, so $k_{ilower} \leq k_{jupper}$ $k_{jlower} \leq k_{iupper}$ We can expand this to give:

$$\left(k_{ilower}H_z\frac{D_x}{D_z}\right)\frac{D_y}{D_z} \leq \left(k_{jupper}H_z\frac{D_y}{D_z}\right)\frac{D_x}{D_z}$$

$$\left(k_{jlower}H_z\frac{D_y}{D_z}\right)\frac{D_x}{D_z} \leq \left(k_{iupper}H_z\frac{D_x}{D_z}\right)\frac{D_y}{D_z}$$

Then we can substitute the expressions in the brackets using the equations given for $k_{ilower}$, $k_{iupper}$, $k_{jlower}$ and $k_{jupper}$ above to get:

$$\left(C_x - C_z\frac{D_x}{D_z} - H_x\right)\frac{D_y}{D_z} \leq \left(C_y - C_z\frac{D_y}{D_z} + H_y\right)\frac{D_x}{D_z}$$

$$\left(C_y - C_z\frac{D_y}{D_z} - H_y\right)\frac{D_y}{D_z} \leq \left(C_x - C_z\frac{D_x}{D_z} + H_x\right)\frac{D_y}{D_z}$$

Expanding and rearranging these inequalities gives:

$$C_x\frac{D_y}{D_z} - C_y\frac{D_x}{D_z} \leq H_y\frac{D_x}{D_z} + H_x\frac{D_y}{D_z}$$

$$-\left(C_x\frac{D_y}{D_z} - C_y\frac{D_x}{D_z}\right) \leq H_x\frac{D_y}{D_z} + H_y\frac{D_x}{D_z}$$

By appreciating the symmetry in these two inequalities, it can be seen that they reduce to one condition:

$$\left|C_x\frac{D_y}{D_z} - C_y\frac{D_x}{D_z}\right| \leq H_y\frac{D_x}{D_z} + H_z\frac{D_y}{D_z}$$

This is the third condition that is checked in step S308.

So to summarise the maths given above, for the ray to intersect the box, the following three conditions must be satisfied:

$$\left|C_x - C_z\frac{D_x}{D_z}\right| \leq H_z\frac{D_x}{D_z} + H_x$$

$$\left|C_y - C_z\frac{D_y}{D_z}\right| \leq H_z\frac{D_y}{D_z} + H_y$$

$$\left|C_x\frac{D_y}{D_z} - C_y\frac{D_x}{D_z}\right| \leq H_y\frac{D_x}{D_z} + H_x\frac{D_y}{D_z}$$

This is what is checked by the box intersection testing unit(s) 112 in step S308.

The values of $$\frac{D_x}{D_z} \text{ and } \frac{D_y}{D_z}$$

can be pre-computed for a ray and stored, rather than computing them each time an intersection test is performed for the ray. It is a simple process to read the pre-computed values of $$\frac{D_x}{D_z} \text{ and } \frac{D_y}{D_z}$$

from a store; in particular, this is simpler than performing a division operation each time one of these values is required. For example, these values may be obtained in step S302. The values of $C_x$, $C_y$ and $C_z$ are easily computed in step S304 by subtracting the respective components of the ray origin from the world space components of the centre of the box that are read in step S302. The half widths $H_x$, $H_y$ and $H_z$ are also easily obtained, e.g. they can be read in step S302. So the three comparisons of step S308 are simple to implement in the intersection testing module 108. In particular, each of the operations performed in step S308 just comprises some multiply-and-add operations and a comparison operation. The multiply-and-add operations can be implemented using small fixed function circuitry in the box intersection testing unit(s) 112 with very low latency and low power consumption, e.g. by using fused multiply-add units.

The determinations of whether the first, second and third conditions are satisfied are used to determine whether the ray 202 intersects the axis-aligned box 204. In particular, as mentioned above, if at least one of the first, second and third conditions is determined to be not satisfied then the method passes from step S308 to step S314 in which it is determined that the ray misses the box (i.e. it does not intersect the box). If it is determined in step S308 that all three of the conditions are satisfied then the method passes to step S310.

Figure 4A:
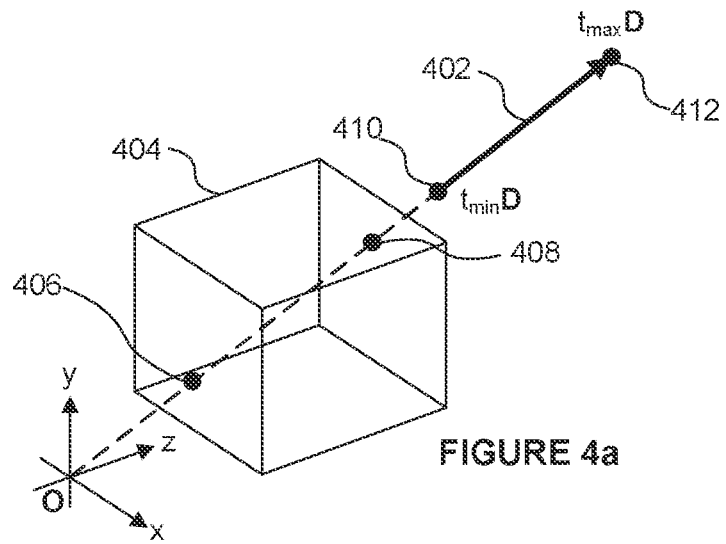
FIG. 4a shows a ray and a box where the start of the ray is beyond the box.

In step S310 the intersection testing module 108 (specifically the box intersection testing unit(s) 112) determines whether a minimum distance condition and a maximum distance condition are satisfied. The minimum distance condition is satisfied if a minimum distance of the ray from the ray origin is less than or equal to a maximum distance from the ray origin to an intersection of the ray direction vector with the box. In other words, the minimum distance condition is satisfied if the start of the ray (defined by a value of $t_{min}$) is not beyond the box when looking along the direction vector of the ray. FIG. 4*a* shows an example in which the intersection testing module 108 determines whether a ray 402 intersects a box 404. In step S308 it will be determined that all three of the conditions are satisfied because the dashed line representing the ray direction vector from the origin intersects the box 404. In particular the closest intersection of the ray direction vector with the box 404 is at point 406, and the furthest intersection of the ray direction vector with the box 404 is at point 408. In some examples $t_{min}=0$ such that the minimum distance of the ray from the ray origin is zero, but in the example shown in FIG. 4*a* $t_{min} \neq 0$. It is noted that because of the selective permutation and reversing of the x, y and z components of the ray and the box in step S306, the direction vector of the ray will be in the positive octant, i.e. $D_x \geq 0$, $D_y \geq 0$, and $D_z \geq 0$. In the example shown in FIG. 4*a* the minimum distance of the ray from the ray origin 410 is greater than the maximum distance from the ray origin to an intersection of the ray direction vector with the box at point 408. Therefore, in this example, in step S310 it will be determined that the minimum distance condition is not satisfied. As will become apparent after the following description of the maximum distance condition, it is noted that the maximum distance condition is satisfied in the example shown in FIG. 4a because the maximum distance of the ray from the ray origin at point 412 is greater than the minimum distance from the ray origin to an intersection of the ray direction vector with the box at point 406.

Figure 4B:
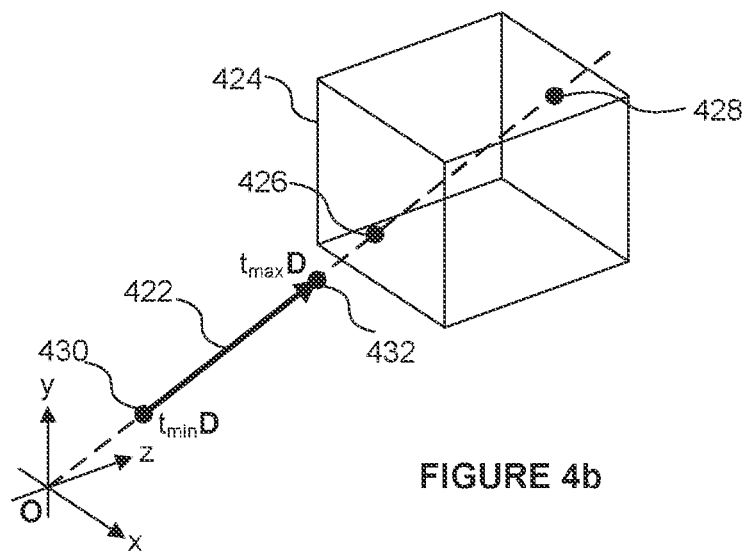
FIG. 4b shows a ray and a box where the end of the ray is before the box.

The maximum distance condition is satisfied if a maximum distance of the ray from the ray origin is greater than or equal to a minimum distance from the ray origin to an intersection of the ray direction vector with the box. In other words, the maximum distance condition is satisfied if the end of the ray (defined by a value of $t_{max}$) is not before the box when looking along the direction vector of the ray. FIG. 4b shows an example in which the intersection testing module 108 determines whether a ray 422 intersects a box 424. In step S308 it will be determined that all three of the conditions are satisfied because the dashed line representing the ray direction vector from the origin intersects the box 424. In particular the closest intersection of the ray direction vector with the box 424 is at point 426, and the furthest intersection of the ray direction vector with the box 424 is at point 428. In the example shown in FIG. 4b the maximum distance of the ray from the ray origin 432 is less than the minimum distance from the ray origin to an intersection of the ray direction vector with the box at point 426. Therefore, in this example, in step S310 it will be determined that the maximum distance condition is not satisfied. It is noted that the minimum distance condition is satisfied in the example shown in FIG. 4b because the minimum distance of the ray from the ray origin at point 430 is less than the maximum distance from the ray origin to an intersection of the ray direction vector with the box at point 428.

Figure 4C:
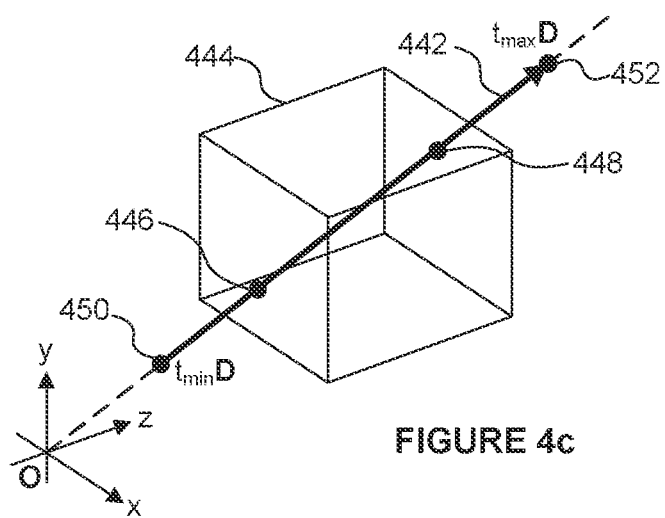
FIG. 4c shows a ray and a box where the start of the ray is before the box and the end of the ray is beyond the box.

FIG. 4c shows an example in which the intersection testing module 108 determines whether a ray 442 intersects a box 444. In step S308 it will be determined that all three of the conditions are satisfied because the dashed line representing the ray direction vector from the origin intersects the box 444. In particular the closest intersection of the ray direction vector with the box 444 is at point 446, and the furthest intersection of the ray direction vector with the box 424 is at point 448. In the example shown in FIG. 4c, the minimum distance condition is satisfied because the minimum distance of the ray from the ray origin at point 450 is less than the maximum distance from the ray origin to an intersection of the ray direction vector with the box at point 448. Also, in the example shown in FIG. 4c, the maximum distance condition is satisfied because the maximum distance of the ray from the ray origin at point 452 is greater than the minimum distance from the ray origin to an intersection of the ray direction vector with the box at point 446.

An example method of performing the minimum and maximum distance culling in step S310 is now described. Given $t_{min}$ and $t_{max}$, a centre t value ($t_c$) and a half width t value ($t_h$) are precomputed as:

$$t_c = \frac{t_{max} + t_{min}}{2}$$

$$t_h = \frac{t_{max} - t_{min}}{2}$$

For brevity, we extend the ≤ (and similarly ≥) binary operator to 3D as . . .

$$A \leq B = \begin{bmatrix} A_x \\ A_y \\ A_z \end{bmatrix} \leq \begin{bmatrix} B_x \\ B_y \\ B_z \end{bmatrix} = ((A_x \leq B_x) \wedge (A_y \leq B_y) \wedge (A_z \leq B_z))$$

. . . and similarly, define a vector, piecewise absolute operator, [[A]], as $$[\![A]\!] = \begin{bmatrix} |A_x| \\ |A_y| \\ |A_z| \end{bmatrix}$$

The minimum and maximum distance conditions are satisfied only if:

$$[\![t_c \cdot D - C]\!] \leq H + t_h \cdot D$$

The $t_c \cdot D$ and $t_h \cdot D$ vector values can be precalculated for the ray for use with multiple box tests. It is noted that in this example, the minimum and maximum distance conditions are both tested with a single comparison in step S310, wherein the single comparison is $[\![t_c \cdot D - C]\!] \leq H + t_h \cdot D$. In other words, step S310 of determining whether the minimum and maximum distance conditions are satisfied comprises determining whether a single distance condition is satisfied, where a determination that the single distance condition is satisfied indicates that both the minimum distance condition and the maximum distance condition are satisfied. The symmetry in the conditions has been used again in order to reduce the two conditions (minimum and maximum distance conditions) into a single condition that needs to be satisfied. In other examples, the minimum and maximum distance conditions are tested with separate comparisons in step S310.

The above result can be demonstrated as follows. For the minimum and maximum distance conditions to be satisfied, the point corresponding to $t_{min}$ on the ray must not be behind the box, i.e.

$$t_{min} \cdot D \leq C + H$$

. . . and, similarly, $t_{max}$ must not be in front, i.e.

$$t_{max} \cdot D \geq C - H$$

This thus implies $$(t_c - t_h) \cdot D \leq C + H$$

$$\Leftrightarrow t_c \cdot D - C \leq H + t_h \cdot D$$

and $$(t_c + t_h) \cdot D \geq C - H$$

$$\Leftrightarrow t_c \cdot D - C \geq -(H + t_h \cdot D)$$

$$\Leftrightarrow -(t_c \cdot D - C) \leq H + t_h \cdot D$$

Together, these imply $$[\![t_c \cdot D - C]\!] \leq H + t_h \cdot D$$

The determinations in step S310 of whether the minimum distance condition and maximum distance condition are satisfied are used to determine whether the ray intersects the axis-aligned box. If one or both of the minimum distance condition and the maximum distance condition are not satisfied (e.g. in the examples shown in FIGS. 4a and 4b) then the method passes from step S310 to step S314 in which the intersection testing module 108 (specifically the box intersection testing unit(s) 112) determines that the ray does not intersect the box. However, if both of the minimum distance condition and the maximum distance condition are satisfied (e.g. in the example shown in FIG. 4c) then the method passes from step S310 to step S312 in which the intersection testing module 108 (specifically the box intersection testing unit(s) 112) determines that the ray does intersect the box. It is noted that in order to arrive at step S312, i.e. in order for the intersection testing module to determine that the ray intersects the axis-aligned box, all of the first, second, third, maximum distance and minimum distance conditions are determined to be satisfied in steps S308 and S310. In the examples described herein the three conditions of step S308 and the condition(s) of step S310 are the only conditions for determining whether the ray intersects the box. It is noted that the minimum and maximum distance conditions of step S310 may be reduced to a single distance condition (e.g. $[[t_c \cdot D - C]] \leq H + t_h \cdot D$) as explained above. Furthermore, it is noted that steps S308 and S310 can be performed in parallel or sequentially in different implementations.

Following steps S312 and/or S314 the method passes to step S316 in which the intersection testing module 108 outputs an indication of the result of the determination of whether the ray intersects the box. This indication could be a binary indication (e.g. a one-bit flag) to indicate either a 'hit' or a 'miss' of the ray in respect of the box. In other examples, the indications could have different forms. In step S318, the outputted indication is used in the ray tracing system 100 (e.g. by the processing logic 110) for rendering an image of a 3D scene. For example, the box may bound geometry to be rendered in a scene. If the box corresponds to a node of a hierarchical acceleration structure to be used for performing intersection testing in the ray tracing system then the indication of whether the ray intersects the box can be used to determine whether to test the ray for intersection with boxes corresponding to any child nodes of the node corresponding to the intersected box. For example, if a ray intersects a box corresponding to a parent node then the ray is tested for intersection with boxes corresponding to the child nodes of that parent node, whereas if a ray does not intersect a box corresponding to a parent node then the ray is not tested for intersection with boxes corresponding to the child nodes of that parent node. If a ray intersects a box corresponding to a leaf node of the hierarchical acceleration structure then the ray can be tested for intersection with any geometry (e.g. triangles or other primitives) that are referenced by the leaf node.

In the example shown in FIG. 3, the data defining the ray and the box is read in step S302, and then in step S304 the components of the ray origin are subtracted from the data defining the position of the box, and then in step S306 the x, y and z components of the ray and the box are selectively permuted and/or reversed so that $D_z \geq D_x \geq 0$ and $D_z \geq D_y \geq 0$. However, the ordering of these three steps (steps S302 to S306) may be different in different examples. For example, the selective permutation and/or reversing of the x, y and z components of the ray and the box data may be performed before the data is obtained. It can be useful to perform this selective permutation and/or reversing of the x, y and z components of the ray data before the data is read in, so that we know that $D_z \geq D_x \geq 0$ and $D_z \geq D_y \geq 0$ before the data is read in. This allows some pre-computation of the ray data to be performed and the pre-computed data can be stored in a store (e.g. a memory on the ray tracing unit 102) before it is read into the intersection testing module 108. This means that the processing involved in this pre-computation can be performed once for a ray and used multiple times if the ray is involved in multiple intersection tests. As described above the pre-computed ray direction data that is read by the intersection testing module could comprise values of $$\frac{D_x}{D_z}, \frac{D_y}{D_z} \text{ and } D_z \text{ or } \frac{1}{D_z}, \text{ values of } \frac{D_z}{D_x}, \frac{D_z}{D_y} \text{ and}$$

$$D_z \text{ or } \frac{1}{D_z}, \text{ or values of } \frac{1}{D_x}, \frac{1}{D_y} \text{ and } D_z \text{ or } \frac{1}{D_z}$$

to give just some examples, and in other examples, other values may be pre-computed and read in order to define the ray direction. If values of $$\frac{D_x}{D_z}, \frac{D_y}{D_z}$$

are pre-computed and stored in a store, then the intersection testing module 108 can just read these values form the store and use them to perform the determinations in step S308 without having to compute these values (e.g. without having to perform a division operation) each time they are needed.

Furthermore, in some examples, the subtraction of the components of the ray origin from the components defining the centre position of the box could be performed in a pre-processing stage, before the data is obtained by the intersection testing module 108. In these examples, the intersection testing module can read in the values of $C_x$, $C_y$ and $C_z$ for use in performing the determinations in step S308 without having to compute these values (i.e. without having to perform the subtractions of step S304). As mentioned above, the intersection testing module 108 can simply read in the values of $H_x$, $H_y$ and $H_z$ for use in performing the determinations in step S308 without needing to perform any calculations on these values first.

The method is described above for use in a ray tracing system which does not introduce any errors into its calculations. However, some calculations, e.g. calculations performed using numbers in a floating point format may introduce rounding errors. This is partly because the precision with which floating point numbers can be represented varies for numbers of different magnitudes. The 'steps' between sequential floating point numbers are generally approximately proportional to the magnitude of the floating point value (with some exceptions, e.g. in the neighbourhood of zero). In some examples, the box intersection testing unit(s) 112 of the intersection testing module 108 are configured to operate conservatively when testing AABBs. In particular, the comparisons that are used to determine whether the three conditions are satisfied in step S308 can be made to operate conservatively. This means that the method may sometimes give 'false positive' results (i.e. it might sometimes indicate that a ray intersects a box even though it does not), but the method will not give 'false negative' results (i.e. it will not indicate that a ray does not intersect a box when it does in fact intersect the box). False positive results will not introduce rendering errors into the ray tracing process because if a ray is determined to intersect a box then it will be tested for intersection against a further object bounded by the box (e.g. another box corresponding to a child node, or a piece of geometry), so it will ultimately be found not to intersect the further object. False positive results may reduce the efficiency of the intersection testing process by increasing the number of tests that are performed, but this is acceptable provided that the proportion of positive results which are false positive results (rather than true positive results) is low, e.g. less than 1% or less than 5% to give some examples. So, a small number of false positive results is acceptable in the ray-box intersection testing process. However, 'false negative' results may introduce rendering errors into the ray tracing process because if a ray is determined to miss a box then it will not be tested for intersection with a further object bounded by the box even though the ray might actually intersect the further object. Rendering errors are not normally acceptable, so false negative results are not acceptable in the ray-box intersection testing process.

So in some examples, the determinations of whether the first, second and third conditions are satisfied are performed conservatively in step S308, such that any errors introduced by rounding in the determination process cannot cause a determination that a condition is not satisfied if a perfectly accurate determination would have determined that that condition is satisfied.

For example, the determination of whether the first condition is satisfied can be performed conservatively by determining whether $$rounddown\left(\left|C_x - C_z\frac{D_x}{D_z}\right|\right) \leq roundup\left(H_z\frac{D_x}{D_z} + H_x\right);$$

the determination of whether the second condition is satisfied can be performed conservatively by determining whether $$rounddown\left(\left|C_y - C_z\frac{D_y}{D_z}\right|\right) \leq roundup\left(H_z\frac{D_y}{D_z} + H_y\right);$$

and the determination of whether the third condition is satisfied can be performed conservatively by determining whether $$rounddown\left(\left|C_x\frac{D_y}{D_z} - C_y\frac{D_x}{D_z}\right|\right) \leq roundup\left(H_y\frac{D_x}{D_z} + H_x\frac{D_y}{D_z}\right).$$

In these expressions, "roundup" indicates the expression is rounded towards +∞, and "rounddown" indicates that multiplication and subtraction operations are rounded appropriately so that the respective overall expression is rounded towards −∞. In this example, it is simple to implement the "roundup" rounding because all of the sub-components are positive, so each calculation (i.e. multiplication or addition) is rounded towards +∞, and this will have the effect of rounding the overall expression towards +∞. However, it is not so simple to implement the "rounddown" rounding because the appropriate rounding to apply to each calculation (e.g. each multiplication or addition/subtraction) in the expression depends upon the relative signs and magnitudes of the values in the expression. The relative signs and magnitudes of the values are not known in advance without actually calculating the results, so in order to implement the "rounddown" rounding, the calculations may be performed for both rounded up and rounded down results, and then the appropriately rounded result of each calculation in the expression can be chosen so that the overall expression is rounded towards −∞. This is possible to implement, e.g. using some form of interval arithmetic, but it is complex, which would tend to mean that the size and/or latency of the intersection testing module 108 would be increased.

In another example, the determination of whether the first condition is satisfied can be performed conservatively by determining whether $$\left|C_x - C_z\frac{D_x}{D_z}\right| \leq roundup\left(H_z\frac{D_x}{D_z} + H_x\right) + SafetyFactor_{xz};$$

the determination of whether the second condition is satisfied can be performed conservatively by determining whether $$\left|C_y - C_z\frac{D_y}{D_z}\right| \leq roundup\left(H_z\frac{D_y}{D_z} + H_y\right) + SafetyFactor_{yz};$$

and the determination of whether the third condition is satisfied can be performed conservatively by determining whether $$\left|C_x\frac{D_y}{D_z} - C_y\frac{D_x}{D_z}\right| \leq roundup\left(H_z\frac{D_x}{D_z} + H_x\frac{D_y}{D_z}\right) + SafetyFactor_{xy}.$$

As in the example above, "roundup" indicates that multiplication and addition operations are rounded towards +∞. Instead of using the "rounddown" rounding, three "SafetyFactors" are used: (i) "SafetyFactor$_{xz}$", which is an upper bound on the error introduced by rounding when determining $$\left|C_x - C_z\frac{D_x}{D_z}\right|;$$

"SafetyFactor$_{yz}$", (ii)

which is an upper bound on the error introduced by rounding when determining $$\left|C_y - C_z\frac{D_y}{D_z}\right|;$$

"SafetyFactor$_{xy}$", (iii)

which is an upper bound on the error introduced by rounding when determining $$\left|C_x\frac{D_y}{D_z} - C_y\frac{D_x}{D_z}\right|.$$

Using the safety factors is simpler to implement (which may lead to a smaller silicon area and latency of the intersection testing module 108) than using the "rounddown" rounding because the three safety factors can be predetermined, and can simply be added on to the rounded up expressions. The use of the safety factors might make the intersection testing more 'conservative' than the use of the "rounddown" rounding, i.e. it might lead to more false positives, but this may be deemed to be acceptable, particularly if it leads to a smaller silicon area of the intersection testing module 108. As mentioned above, false positives in the ray-box intersection testing will not introduce rendering errors, but it may slightly reduce the efficiency of the intersection testing process by increasing the number of tests that are performed. The values of the three safety factors are determined to ensure that any rounding errors introduced in the calculations performed in step S308 do not lead to false negative results. The safety factors can be determined based on one or more of the input values, e.g. based on the components of C and H. For simplicity, the safety factors may be based just on the exponents of the floating point values of one or more of the input values. For example, SafetyFactor$_{xz}$ may be a function which depends upon $C_x$, $C_z$ and $$\frac{D_x}{D_z};$$

SafetyFactor$_{yz}$ may be a function which depends upon $C_y$, $C_z$ and $$\frac{D_y}{D_z};$$

and SafetyFactor$_{xy}$ may be a function which depends upon $C_x$, $C_y$, $$\frac{D_x}{D_z} \text{ and } \frac{D_y}{D_z}.$$

For example, the exponents of the relevant input parameters could be used with some precomputed worst-case errors (e.g. rounded up to a power of 2) in order to determine the safety factors. In a simpler implementation, the maximum magnitude component in the input could be determined, and the safety factor could be determined based on that.

In some examples, a top-level acceleration structure (TLAS) may be used to represent a scene in a world space coordinate system. Nodes of the TLAS correspond to boxes (e.g. AABBs which are aligned to the axes of the world space coordinate system) representing regions in the scene. A set of geometry (e.g. representing an object) may be defined and one or more instances of the set of geometry can be inserted into respective positions within the scene. The set of geometry is defined in an instance space coordinate system, and a bottom-level acceleration structure (BLAS) is created with nodes corresponding to boxes (e.g. AABBs which are aligned to the axes of the instance space coordinate system) representing regions in the instance space. One or more nodes of the TLAS may reference nodes of a BLAS. A ray first traverses nodes of the TLAS, wherein if the ray is found to intersect with a node that references a node of a BLAS then the ray can be tested for intersection with boxes corresponding to nodes of the BLAS. The intersection testing module 108 (e.g. the instance transform unit 118) can transform the ray into the instance space coordinate system in order to be tested for intersection with boxes corresponding to nodes of the BLAS. The boxes described herein could correspond to nodes of a TLAS (i.e. the boxes could be axis-aligned boxes in world space), or the boxes described herein could correspond to nodes of a BLAS (i.e. the boxes could be axis-aligned boxes in an instance space).

Figure 5:
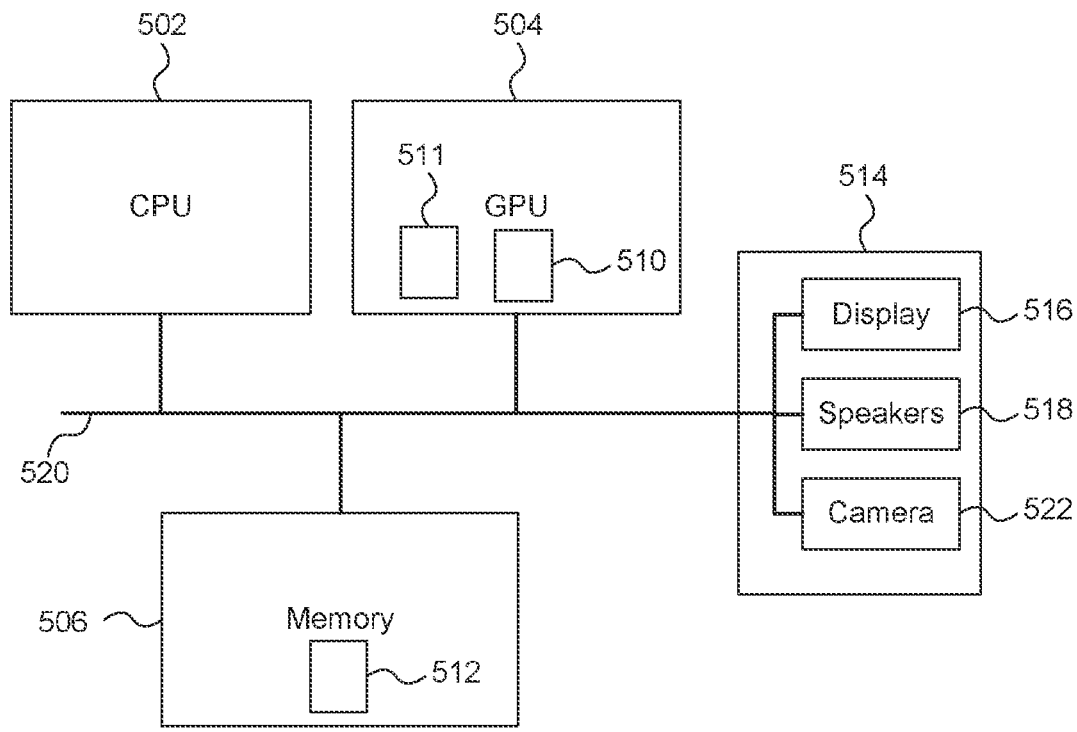
FIG. 5 shows a computer system in which a ray tracing system is implemented.

FIG. 5 shows a computer system in which the ray tracing systems described herein may be implemented. The computer system comprises a CPU 502, a GPU 504, a memory 506 and other devices 514, such as a display 516, speakers 518 and a camera 522. A ray tracing unit 510 (corresponding to ray tracing unit 102) is implemented on the GPU 504, as well as a Neural Network Accelerator (NNA) 511. In other examples, the ray tracing unit 510 may be implemented on the CPU 502 or within the NNA 511 or as a separate processing unit in the computer system. The components of the computer system can communicate with each other via a communications bus 520. A store 512 (corresponding to memory 104) is implemented as part of the memory 506.

The ray tracing system of FIG. 1 is shown as comprising a number of functional blocks. This is schematic only and is not intended to define a strict division between different logic elements of such entities. Each functional block may be provided in any suitable manner. It is to be understood that intermediate values described herein as being formed by a ray tracing system need not be physically generated by the ray tracing system at any point and may merely represent logical values which conveniently describe the processing performed by the ray tracing system between its input and output.

The ray tracing units, and specifically the intersection testing modules described herein may be embodied in hardware on an integrated circuit. The intersection testing modules described herein may be configured to perform any of the methods described herein. Generally, any of the functions, methods, techniques or components described above can be implemented in software, firmware, hardware (e.g., fixed logic circuitry), or any combination thereof. The terms "module," "functionality," "component", "element", "unit", "block" and "logic" may be used herein to generally represent software, firmware, hardware, or any combination thereof. In the case of a software implementation, the module, functionality, component, element, unit, block or logic represents program code that performs the specified tasks when executed on a processor. The algorithms and methods described herein could be performed by one or more processors executing code that causes the processor(s) to perform the algorithms/methods. Examples of a computer-readable storage medium include a random-access memory (RAM), read-only memory (ROM), an optical disc, flash memory, hard disk memory, and other memory devices that may use magnetic, optical, and other techniques to store instructions or other data and that can be accessed by a machine.

The terms computer program code and computer readable instructions as used herein refer to any kind of executable code for processors, including code expressed in a machine language, an interpreted language or a scripting language. Executable code includes binary code, machine code, bytecode, code defining an integrated circuit (such as a hardware description language or netlist), and code expressed in a programming language code such as C, Java or OpenCL. Executable code may be, for example, any kind of software, firmware, script, module or library which, when suitably executed, processed, interpreted, compiled, executed at a virtual machine or other software environment, cause a processor of the computer system at which the executable code is supported to perform the tasks specified by the code.

A processor, computer, or computer system may be any kind of device, machine or dedicated circuit, or collection or portion thereof, with processing capability such that it can execute instructions. A processor may be or comprise any kind of general purpose or dedicated processor, such as a CPU, GPU, NNA, System-on-chip, state machine, media processor, an application-specific integrated circuit (ASIC), a programmable logic array, a field-programmable gate array (FPGA), or the like. A computer or computer system may comprise one or more processors.

It is also intended to encompass software which defines a configuration of hardware as described herein, such as HDL (hardware description language) software, as is used for designing integrated circuits, or for configuring programmable chips, to carry out desired functions. That is, there may be provided a computer readable storage medium having encoded thereon computer readable program code in the form of an integrated circuit definition dataset that when processed (i.e. run) in an integrated circuit manufacturing system configures the system to manufacture an intersection testing module configured to perform any of the methods described herein, or to manufacture an intersection testing module comprising any apparatus described herein. An integrated circuit definition dataset may be, for example, an integrated circuit description.

Therefore, there may be provided a method of manufacturing, at an integrated circuit manufacturing system, an intersection testing module as described herein. Furthermore, there may be provided an integrated circuit definition dataset that, when processed in an integrated circuit manufacturing system, causes the method of manufacturing an intersection testing module to be performed.

An integrated circuit definition dataset may be in the form of computer code, for example as a netlist, code for configuring a programmable chip, as a hardware description language defining hardware suitable for manufacture in an integrated circuit at any level, including as register transfer level (RTL) code, as high-level circuit representations such as Verilog or VHDL, and as low-level circuit representations such as OASIS (RTM) and GDSII. Higher level representations which logically define hardware suitable for manufacture in an integrated circuit (such as RTL) may be processed at a computer system configured for generating a manufacturing definition of an integrated circuit in the context of a software environment comprising definitions of circuit elements and rules for combining those elements in order to generate the manufacturing definition of an integrated circuit so defined by the representation. As is typically the case with software executing at a computer system so as to define a machine, one or more intermediate user steps (e.g. providing commands, variables etc.) may be required in order for a computer system configured for generating a manufacturing definition of an integrated circuit to execute code defining an integrated circuit so as to generate the manufacturing definition of that integrated circuit.

An example of processing an integrated circuit definition dataset at an integrated circuit manufacturing system so as to configure the system to manufacture an intersection testing module will now be described with respect to FIG. 6.

Figure 6:
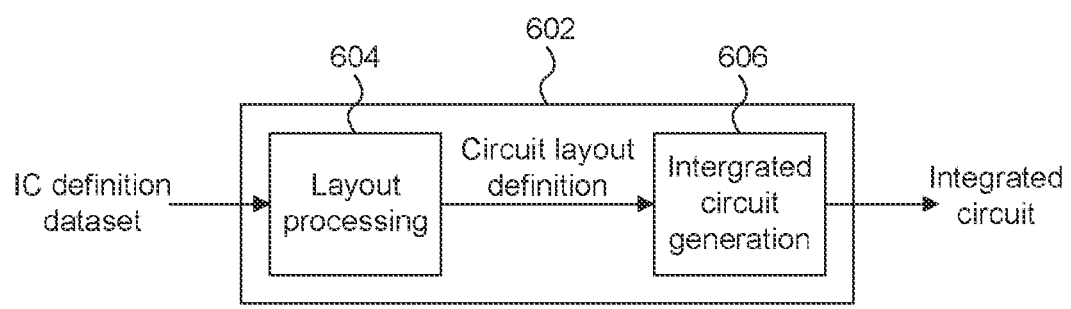
FIG. 6 shows an integrated circuit manufacturing system for generating an integrated circuit embodying a ray tracing system.

FIG. 6 shows an example of an integrated circuit (IC) manufacturing system 602 which is configured to manufacture an intersection testing module as described in any of the examples herein. In particular, the IC manufacturing system 602 comprises a layout processing system 604 and an integrated circuit generation system 606. The IC manufacturing system 602 is configured to receive an IC definition dataset (e.g. defining an intersection testing module as described in any of the examples herein), process the IC definition dataset, and generate an IC according to the IC definition dataset (e.g. which embodies an intersection testing module as described in any of the examples herein). The processing of the IC definition dataset configures the IC manufacturing system 602 to manufacture an integrated circuit embodying an intersection testing module as described in any of the examples herein.

The layout processing system 604 is configured to receive and process the IC definition dataset to determine a circuit layout. Methods of determining a circuit layout from an IC definition dataset are known in the art, and for example may involve synthesising RTL code to determine a gate level representation of a circuit to be generated, e.g. in terms of logical components (e.g. NAND, NOR, AND, OR, MUX and FLIP-FLOP components). A circuit layout can be determined from the gate level representation of the circuit by determining positional information for the logical components. This may be done automatically or with user involvement in order to optimise the circuit layout. When the layout processing system 604 has determined the circuit layout it may output a circuit layout definition to the IC generation system 606. A circuit layout definition may be, for example, a circuit layout description.

The IC generation system 606 generates an IC according to the circuit layout definition, as is known in the art. For example, the IC generation system 606 may implement a semiconductor device fabrication process to generate the IC, which may involve a multiple-step sequence of photo lithographic and chemical processing steps during which electronic circuits are gradually created on a wafer made of semiconducting material. The circuit layout definition may be in the form of a mask which can be used in a lithographic process for generating an IC according to the circuit definition. Alternatively, the circuit layout definition provided to the IC generation system 606 may be in the form of computer-readable code which the IC generation system 606 can use to form a suitable mask for use in generating an IC.

The different processes performed by the IC manufacturing system 602 may be implemented all in one location, e.g. by one party. Alternatively, the IC manufacturing system 602 may be a distributed system such that some of the processes may be performed at different locations, and may be performed by different parties. For example, some of the stages of: (i) synthesising RTL code representing the IC definition dataset to form a gate level representation of a circuit to be generated, (ii) generating a circuit layout based on the gate level representation, (iii) forming a mask in accordance with the circuit layout, and (iv) fabricating an integrated circuit using the mask, may be performed in different locations and/or by different parties.

In other examples, processing of the integrated circuit definition dataset at an integrated circuit manufacturing system may configure the system to manufacture an intersection testing module without the IC definition dataset being processed so as to determine a circuit layout. For instance, an integrated circuit definition dataset may define the configuration of a reconfigurable processor, such as an FPGA, and the processing of that dataset may configure an IC manufacturing system to generate a reconfigurable processor having that defined configuration (e.g. by loading configuration data to the FPGA).

In some embodiments, an integrated circuit manufacturing definition dataset, when processed in an integrated circuit manufacturing system, may cause an integrated circuit manufacturing system to generate a device as described herein. For example, the configuration of an integrated circuit manufacturing system in the manner described above with respect to FIG. 6 by an integrated circuit manufacturing definition dataset may cause a device as described herein to be manufactured.

In some examples, an integrated circuit definition dataset could include software which runs on hardware defined at the dataset or in combination with hardware defined at the dataset. In the example shown in FIG. 6, the IC generation system may further be configured by an integrated circuit definition dataset to, on manufacturing an integrated circuit, load firmware onto that integrated circuit in accordance with program code defined at the integrated circuit definition dataset or otherwise provide program code with the integrated circuit for use with the integrated circuit.

The implementation of concepts set forth in this application in devices, apparatus, modules, and/or systems (as well as in methods implemented herein) may give rise to performance improvements when compared with known implementations. The performance improvements may include one or more of increased computational performance, reduced latency, increased throughput, and/or reduced power consumption. During manufacture of such devices, apparatus, modules, and systems (e.g. in integrated circuits) performance improvements can be traded-off against the physical implementation, thereby improving the method of manufacture. For example, a performance improvement may be traded against layout area, thereby matching the performance of a known implementation but using less silicon. This may be done, for example, by reusing functional blocks in a serialised fashion or sharing functional blocks between elements of the devices, apparatus, modules and/or systems. Conversely, concepts set forth in this application that give rise to improvements in the physical implementation of the devices, apparatus, modules, and systems (such as reduced silicon area) may be traded for improved performance. This may be done, for example, by manufacturing multiple instances of a module within a predefined area budget.

The applicant hereby discloses in isolation each individual feature described herein and any combination of two or more such features, to the extent that such features or combinations are capable of being carried out based on the present specification as a whole in the light of the common general knowledge of a person skilled in the art, irrespective of whether such features or combinations of features solve any problems disclosed herein. In view of the foregoing description it will be evident to a person skilled in the art that various modifications may be made within the scope of the invention.

What is claimed is:

1. A method of performing intersection testing of a ray with a box in a ray tracing system, wherein the ray and the box are defined in a 3D space using a space-coordinate system, and wherein the ray is defined with a ray origin and a ray direction, the method comprising:
    using a ray-coordinate system to perform intersection testing, wherein the ray-coordinate system has an origin at the ray origin, and wherein the ray-coordinate system has three basis vectors,
    wherein a first of the basis vectors is aligned with the ray direction; and
    wherein a second and a third of the basis vectors: (i) are both orthogonal to the first basis vector, (ii) are not parallel with each other, and (iii) have a zero as one component when expressed in the space-coordinate system; and
    outputting a result of performing the intersection testing for use by the ray tracing system.

2. The method of claim 1, further comprising translating one or more position vectors defining the position of the box for use in performing the intersection testing by subtracting the ray origin from the one or more position vectors defining the position of the box.

3. The method of claim 1, wherein the second and the third of the basis vectors of the ray-coordinate system have a value of ±1 as one component when expressed in the space-coordinate system.

4. The method of claim 1, wherein the first basis vector, S, when expressed with components of the space-coordinate system is $S=A(D_x, D_y, D_z)$,
    wherein the second basis vector, P, when expressed with components of the space-coordinate system is $P=B(D_z, 0, -D_x)$; and
    wherein the third basis vector, Q, when expressed with components of the space-coordinate system is $Q=C(0, D_z, -D_y)$;
    wherein $D_x$, $D_y$ and $D_z$ are components of the ray direction in the space-coordinate system and A, B and C are scalar values.

5. The method of claim 4, wherein B is a simplified fraction with $D_x$ in its denominator, and C is a simplified fraction with $D_y$ in its denominator.

6. The method of claim 3, wherein the first basis vector, S, when expressed with components of the space-coordinate system is $S=A(D_x, D_y, D_z)$,
    wherein the second basis vector, P, when expressed with components of the space-coordinate system is $$P = \left(\pm 1, 0, \mp \frac{D_x}{D_z}\right);$$

wherein the third basis vector, Q, when expressed with components of the space-coordinate system is $$Q = \left(0, \pm 1, \mp \frac{D_y}{D_z}\right);$$

wherein $D_x$, $D_y$ and $D_z$ are components of the ray direction in the space-coordinate system and A is a scalar value.

7. The method of claim 3, wherein the first basis vector, S, when expressed with components of the space-coordinate system is $S=A(D_x, D_y, D_z)$,
    wherein the second basis vector, P, when expressed with components of the space-coordinate system is $$P = \left(\pm \frac{D_z}{D_x}, 0, \mp 1\right);$$

and
    wherein the third basis vector, Q, when expressed with components of the space-coordinate system is $$Q = \left(0, \pm \frac{D_z}{D_y}, \mp 1\right);$$

wherein $D_x$, $D_y$ and $D_z$ are components of the ray direction in the space-coordinate system and A is a scalar value.

8. The method of claim 1, wherein the first basis vector, S, when expressed with components of the space-coordinate system is $S=A(D_x, D_y, D_z)$,
    wherein the second basis vector, P, when expressed with components of the space-coordinate system is $$P = \left(\pm \frac{1}{D_x}, 0, \mp \frac{1}{D_z}\right);$$

and
wherein the third basis vector, Q, when expressed with components of the space-coordinate system is $$Q = \left(0, \pm \frac{1}{D_y}, \mp \frac{1}{D_z}\right);$$

wherein $D_x$, $D_y$ and $D_z$ are components of the ray direction in the space-coordinate system and A is a scalar value.

9. The method of claim 1, wherein the first basis vector, S, when expressed with components of the space-coordinate system is $S=A(D_x, D_y, D_z)$,
wherein the second basis vector, P, when expressed with components of the space-coordinate system is $P=(\pm D_z, 0, \mp D_x)$; and
wherein the third basis vector, Q, when expressed with components of the space-coordinate system is $Q=(0, \pm D_z, \mp D_y)$;
wherein $D_x$, $D_y$ and $D_z$ are components of the ray direction in the space-coordinate system and A is a scalar value.

10. The method of claim 4, wherein $$A = \frac{1}{|D_z|}.$$

11. The method of claim 1, further comprising transforming the ray and the box from the space-coordinate system into the ray-coordinate system, wherein the intersection testing is performed in the ray-coordinate system.

12. The method of claim 1, wherein the intersection testing is performed using fixed function circuitry, and optionally wherein the fixed function circuitry comprises one or more multiply-and-add components for performing multiplications and additions using the second and third basis vectors of the ray-coordinate system.

13. The method of claim 1, further comprising selectively permuting the components of the ray and the axis-aligned box, such that $|D_z| \geq |D_x|$ and $|D_z| \geq |D_y|$, before performing intersection testing of the ray with the axis-aligned box.

14. The method of claim 1, further comprising selectively reversing the components of the ray and the axis-aligned box, such that $D_x \geq 0$, $D_y \geq 0$ and $D_z \geq 0$, before performing intersection testing of the ray with the axis-aligned box.

15. The method of claim 1, wherein values of at least one of:

(i) $\frac{D_x}{D_z}$ and $\frac{D_y}{D_z}$, (ii) $\frac{D_z}{D_x}$ and $\frac{D_z}{D_y}$, (iii) $\frac{1}{D_x}$ and $\frac{1}{D_y}$, and (iv) $\frac{1}{D_z}$ or $D_z$, are pre-computed for the ray and stored in a store, wherein the method comprises reading the stored values from the store for use in performing intersection testing.

16. The method of claim 1, wherein the outputted result is used in the ray tracing system for rendering an image of a 3D scene.

17. The method of claim 1, wherein the box is an axis-aligned bounding box which bounds geometry to be rendered.

18. The method of claim 1, wherein the box corresponds to a node of a hierarchical acceleration structure to be used for performing intersection testing in the ray tracing system, and optionally wherein the node is part of a bottom-level acceleration structure (BLAS) for representing geometry in an instance space, and wherein the method comprises transforming the ray into the instance space.

19. A method of performing intersection testing of a ray with a box in a ray tracing system, wherein the ray and the box are defined in an n-dimensional space using a space-coordinate system, wherein $n \geq 3$, and wherein the ray is defined with a ray origin and a ray direction, the method comprising:
using a ray-coordinate system to perform intersection testing, wherein the ray-coordinate system has an origin at the ray origin, and wherein the ray-coordinate system has n basis vectors,
wherein a first of the basis vectors is aligned with the ray direction,
wherein (n−1) of the basis vectors are orthogonal to the first basis vector,
wherein no pairing of the (n−1) basis vectors are parallel with each other, and
wherein the (n−1) basis vectors have zeros for (n−2) components when expressed in the space-coordinate system; and
outputting a result of performing the intersection testing for use by the ray tracing system.

20. An intersection testing module, for use in a ray tracing system, configured to perform intersection testing of a ray with a box, wherein the ray and the box are defined in a 3D space using a space-coordinate system, and wherein the ray is defined with a ray origin and a ray direction, the intersection testing module being configured to:
use a ray-coordinate system to perform intersection testing, wherein the ray-coordinate system has an origin at the ray origin, and wherein the ray-coordinate system has three basis vectors,
wherein a first of the basis vectors is aligned with the ray direction; and
wherein a second and a third of the basis vectors: (i) are both orthogonal to the first basis vector, (ii) are not parallel with each other, and (iii) have a zero as one component when expressed in the space-coordinate system; and
output a result of performing the intersection testing for use by the ray tracing system.

* * * * *